(12) United States Patent
Abe et al.

(10) Patent No.: US 7,239,733 B2
(45) Date of Patent: Jul. 3, 2007

(54) IMAGE DISPLAY APPARATUS, IMAGE DISPLAY METHOD, AND PROGRAM

(75) Inventors: Masahiro Abe, Kanagawa (JP); Keiichi Sakai, Kanagawa (JP); Tsukasa Sako, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 74 days.

(21) Appl. No.: 10/885,059

(22) Filed: Jul. 7, 2004

(65) Prior Publication Data

US 2005/0007387 A1 Jan. 13, 2005

(30) Foreign Application Priority Data

Jul. 7, 2003 (JP) ............................. 2003-271359
Apr. 20, 2004 (JP) ............................. 2004-124408

(51) Int. Cl.
*G06K 9/00* (2006.01)
*G09G 5/00* (2006.01)

(52) U.S. Cl. ..................... 382/132; 345/660

(58) Field of Classification Search ............... 382/132, 382/298; 345/667, 668, 660, 661, 671
See application file for complete search history.

(56) References Cited

U.S. PATENT DOCUMENTS

| | | | | |
|---|---|---|---|---|
| 5,195,147 A | * | 3/1993 | Ohta | 382/185 |
| 5,416,819 A | * | 5/1995 | Uzuyama et al. | 378/116 |
| 5,740,267 A | * | 4/1998 | Echerer et al. | 382/132 |
| 5,995,682 A | * | 11/1999 | Pawlicki et al. | 382/300 |
| 6,222,544 B1 | * | 4/2001 | Tarr et al. | 715/839 |
| 6,603,494 B1 | * | 8/2003 | Banks et al. | 715/807 |
| 2002/0039084 A1 | | 4/2002 | Yamaguchi | 345/1.1 |
| 2002/0048394 A1 | * | 4/2002 | Nagata et al. | 382/132 |
| 2002/0060702 A1 | * | 5/2002 | Sugimoto et al. | 345/864 |
| 2004/0029068 A1 | * | 2/2004 | Sachdeva et al. | 433/24 |

FOREIGN PATENT DOCUMENTS

| | | |
|---|---|---|
| JP | 4-54628 | 2/1992 |
| JP | 9-33231 | 2/1997 |
| JP | 11-099142 | 4/1999 |
| JP | 11-253429 | 9/1999 |
| JP | 2000-132667 | 5/2000 |
| JP | 2003-135440 | 5/2003 |
| JP | 2003-177736 | 6/2003 |

OTHER PUBLICATIONS

CADTutor (www.cadtutor.net/acad/acadr14/dims/dims.html).*
http://web.archive.org/web/20030221010139/http://www.cadtutor.net/acad/acadr14/dims/dims.html.*
Wu, Michael, "ASIC Applications in Computed Tomography Systems", ASIC Conf. & Ex., 1991.

* cited by examiner

*Primary Examiner*—Kee M. Tung
*Assistant Examiner*—Michelle K. Lay
(74) *Attorney, Agent, or Firm*—Fitzpatrick, Cella, Harper & Scinto

(57) ABSTRACT

The magnification of an image is set. The distance between the positions of two designated points on the image is measured. On the basis of the set magnification set and a measurement value, an actual measurement value on the object corresponding to the measurement value of the distance between the positions of the two designated points on the image is calculated. The set magnification, the measurement value, and the calculated actual measurement value are simultaneously displayed.

26 Claims, 18 Drawing Sheets

STAND-UP ~411

F I G. 11
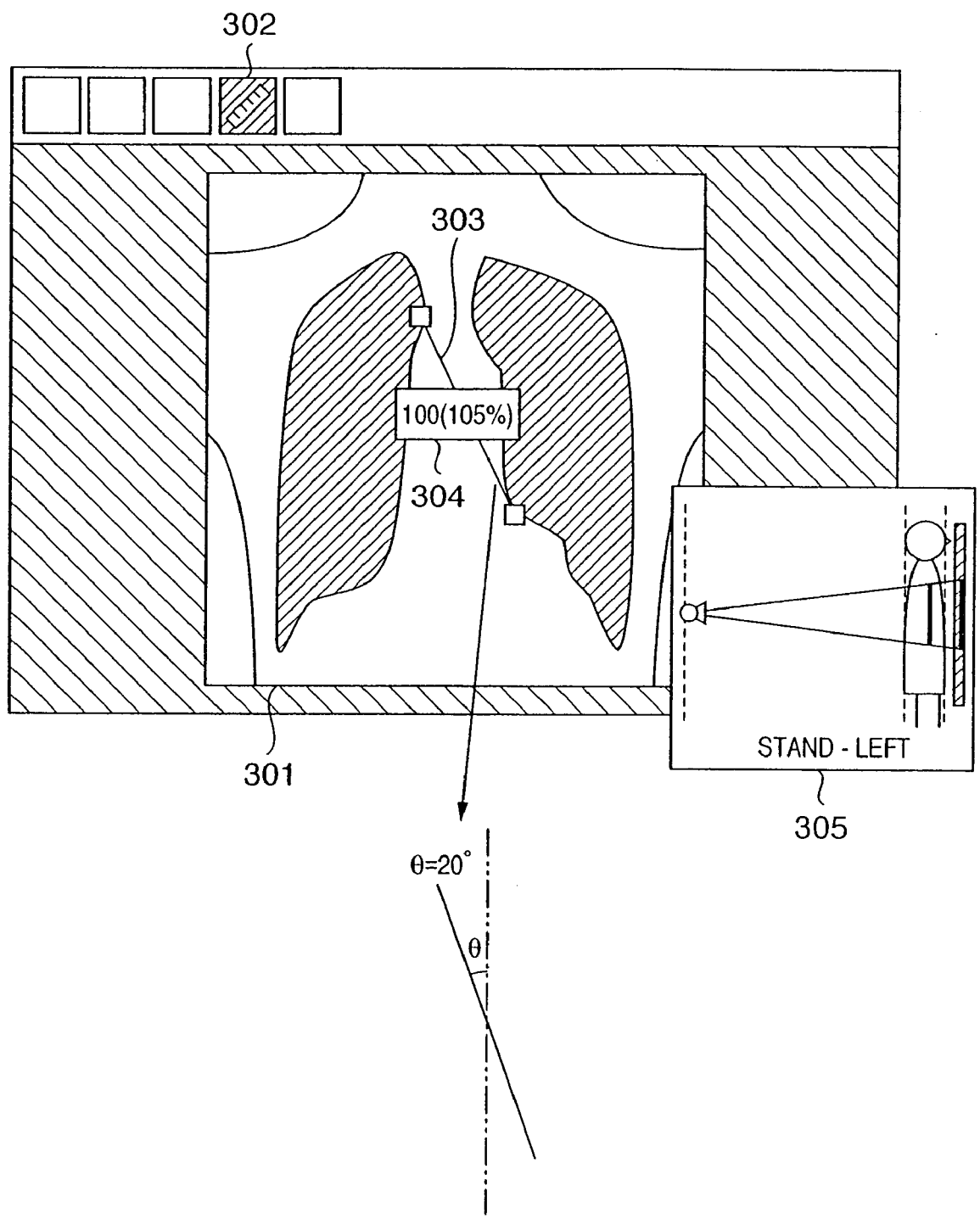

IMAGE DISPLAY APPARATUS, IMAGE DISPLAY METHOD, AND PROGRAM

CLAIM OF PRIORITY

This application claims priorities from Japanese Patent Application Nos. 2003-271359 filed on Jul. 7, 2003 and 2004-124408 filed on Apr. 20, 2004, the entire contents of which are incorporated herein by reference.

FIELD OF THE INVENTION

The present invention relates to a medical image display apparatus for displaying a radiographic image.

BACKGROUND OF THE INVENTION

Conventionally, radiodignosis in the medical field means observation of a film image on a viewing screen upon obtaining the film image by radiation exposure. A radiographic image is obtained as an image larger than the actual object size because radiation generated from a tube (radiation generator) is projected on a film through the object.

The distance between two arbitrary points on a film image is conventionally measured by placing a ruler directly on the film. The enlarged magnification must be calculated manually on the basis of the distance from the cassette (film) to the tube.

In recent years, radiographic devices using solid-state image sensing elements have been developed so that digital radiography using a computer is executed. An image obtained by digital radiography is displayed on a monitor such as a CRT or a liquid crystal display and used for diagnosis. In this case, to measure the distance between two points on the image, a scale is superposed on the screen to measure the length of a region to be diagnosed (e.g., Japanese Patent Laid-Open No. 4-54628).

A technique has also been proposed in which the distance from the radiation irradiator to the object and the distance from the object to the radiographic image conversion panel to calculate the radiographic magnification of the object. Accordingly, the distance between two arbitrary points on a radiographed image is accurately measured and displayed (e.g., Japanese Patent Laid-Open No. 11-253429).

When digital X-ray imaging is executed, an image is displayed on a monitor such as a CRT or a liquid crystal display and used for diagnosis. In this case, the distance between two points on the image is measured by using a distance measurement tool or the like as an accessory of the X-ray image display system (e.g., Japanese Patent Laid-Open No. 2000-132667).

In the technique disclosed in Japanese Patent Laid-Open No. 4-54628, the value measured using the scale is the measurement value of an image formed on the sensor which receives radiation that has passed through the object, as described above. Hence, the value is larger by the magnification than the actual object size. Hence, the actual object size cannot be grasped.

In the technique disclosed in Japanese Patent Laid-Open No. 11-253429, only a value corrected by the magnification, i.e., only the actual object size is displayed as the measurement value. Hence, it is difficult to compare the measurement value on the image with the actual object size or grasp the relationship to the magnification.

In the technique disclosed in Japanese Patent Laid-Open No. 2000-132667, the value measured using the distance measurement tool indicates the distance on the sensor which receives X-rays that have passed through the object, as described above. Hence, the value is larger than the actual object size, and the actual object size cannot be obtained. In addition, when only two points on the image are designated, no positions in the direction of depth of the object can be designated. Hence, the distance between two points at different depths cannot be obtained.

SUMMARY OF THE INVENTION

It is an object of the present invention to provide an image display apparatus and an image display method which can easily obtain the actual size of the measurement region in an object.

According to the present invention, the foregoing object is attained by providing an image display apparatus which displays an image of an object radiographed by a radiography unit, comprising: setting means for setting a magnification of the image; measurement means for measuring a distance between positions of two designated points on the image; calculation means for calculating, on the basis of the magnification set by the setting means and a measurement value by the measurement means, an actual measurement value on an object corresponding to the measurement value of the distance between the positions of the two designated points on the image; and display means for simultaneously displaying the magnification set by the setting means, the measurement value by the measurement means, and the actual measurement value calculated by the calculation means.

In a preferred embodiment, the display means simultaneously displays the magnification set by the setting means, the measurement value by the measurement means, and the actual measurement value calculated by the calculation means in a form of an equation representing a relationship therebetween.

The apparatus further comprises drawing means for drawing a line which connects the positions of the two designated points, wherein the display means simultaneously displays the magnification set by the setting means, the measurement value by the measurement means, and the actual measurement value calculated by the calculation means near the line drawn by the drawing means.

In a preferred embodiment, the display means simultaneously displays the magnification set by the setting means, the measurement value by the measurement means, and the actual measurement value calculated by the calculation means on the line drawn by the drawing means.

According to the present invention, the foregoing object is attained by providing an image display apparatus which displays an image of an object radiographed by a radiography unit, comprising: setting means for setting a magnification of the image; measurement means for measuring a distance between positions of two designated points on the image; and calculation means for calculating, on the basis of the magnification set by the setting means and a measurement value by the measurement means, an actual measurement value on an object corresponding to the measurement value of the distance between the positions of the two designated points on the image, wherein the magnification set by the setting means is used only for the actual measurement value on the object, which is calculated by the calculation means after the magnification is set.

In a preferred embodiment, wherein the setting means inputs an actual measurement value of a reference object radiographed in the image and calculates and sets the magnification on the basis of the actual measurement value and a measurement value on the image.

According to the present invention, the foregoing object is attained by providing an image display method of displaying an image of an object radiographed by a radiography unit, comprising: a setting step of setting a magnification of the image; a measurement step of measuring a distance between positions of two designated points on the image; a calculation step of calculating, on the basis of the magnification set in the setting step and a measurement value in the measurement step, an actual measurement value on an object corresponding to the measurement value of the distance between the positions of the two designated points on the image; and a display step of simultaneously displaying the magnification set in the setting step, the measurement value in the measurement step, and the actual measurement value calculated in the calculation step.

According to the present invention, the foregoing object is attained by providing an image display method of displaying an image of an object radiographed by a radiography unit, comprising: a setting step of setting a magnification of the image; a measurement step of measuring a distance between positions of two designated points on the image; and a calculation step of calculating, on the basis of the magnification set in the setting step and a measurement value in the measurement step, an actual measurement value on an object corresponding to the measurement value of the distance between the positions of the two designated points on the image, wherein the magnification set in the setting step is used only for the actual measurement value on the object, which is calculated in the calculation step after the magnification is set.

According to the present invention, the foregoing object is attained by providing a computer program which controls an image display apparatus which displays an image of an object radiographed by a radiography unit, comprising: a program code for a setting step of setting a magnification of the image; a program code for a measurement step of measuring a distance between positions of two designated points on the image; a program code for a calculation step of calculating, on the basis of the magnification set in the setting step and a measurement value in the measurement step, an actual measurement value on an object corresponding to the measurement value of the distance between the positions of the two designated points on the image; and a program code for a display step of simultaneously displaying the magnification set in the setting step, the measurement value in the measurement step, and the actual measurement value calculated in the calculation step.

According to the present invention, the foregoing object is attained by providing a computer program which controls an image display apparatus which displays an image of an object radiographed by a radiography unit, comprising: a program code for a setting step of setting a magnification of the image; a program code for a measurement step of measuring a distance between positions of two designated points on the image; and a program code for a calculation step of calculating, on the basis of the magnification set in the setting step and a measurement value in the measurement step, an actual measurement value on an object corresponding to the measurement value of the distance between the positions of the two designated points on the image, wherein the magnification set in the setting step is used only for the actual measurement value on the object, which is calculated in the calculation step after the magnification is set.

According to the present invention, the foregoing object is attained by providing an image display apparatus which displays an image of an object radiographed by a radiography unit, comprising: image display means for displaying the image; measurement means for measuring a distance between positions of two designated points on the image; measurement value display means for displaying a measurement value by the measurement means; ratio calculation means for calculating a ratio of the measurement value to an actual measurement value on the object corresponding to the measurement value; ratio display means for displaying the ratio calculated by the ratio calculation means; positional relationship setting means for setting a mutual positional relationship between the object, a radiation sensor prepared in the radiography unit, and a radiation source in radiographing the object; and radiography environment display means for displaying a radiography environment including the positional relationship set by the positional relationship setting means, wherein the ratio calculation means calculates the ratio by using the positional relationship set by the positional relationship setting means.

In a preferred embodiment, the ratio calculation means calculates, as the ratio, an enlargement ratio which represents a degree of enlargement of the measurement value from the actual measurement value, and the ratio display means displays the enlargement ratio.

In a preferred embodiment, the ratio calculation means calculates, as the ratio, a reduction ratio which represents a degree of reduction of the measurement value from the actual measurement value, and the ratio display means displays the reduction ratio.

In a preferred embodiment, the radiography environment display means schematically displays the object, the radiation sensor, and the radiation source in an arbitrary window on the basis of the positional relationship therebetween and also displays a display direction representing a direction of the schematic display and a radiography posture of the object.

In a preferred embodiment, when the image displayed in the window is an image on a plane parallel to a surface of the radiation sensor, the positional relationship setting means is configured to be able to change positions of at least the parallel plane, the radiation sensor, and the radiation source.

In a preferred embodiment, when the image displayed in the window is an image on a plane tilted from a surface of the radiation sensor, the positional relationship setting means is configured to be able to change positions of at least end portions of a region corresponding to the image in the tilted plane, the radiation sensor, and the radiation source.

In a preferred embodiment, the positional relationship setting means is configured to be able to control, of a plane of the object, a range displayable in the window.

In a preferred embodiment, the radiography environment display means is configured to be able to change a display form of the radiography environment on the basis of a direction in which a line segment which connects the two points runs.

According to the present invention, the foregoing object is attained by providing an image display system comprising: a radiation sensor; a radiation source which generates radiation toward the radiation sensor; and an image display apparatus of the apparatus.

According to the present invention, the foregoing object is attained by providing an image display method of displaying an image of an object radiographed by a radiography unit, comprising: an image display step of displaying the image; a measurement step of measuring a distance between positions of two designated points on the image; a measurement value display step of displaying a measurement value in the measurement step; a positional relationship setting step of setting a mutual positional relationship between the object, a radiation sensor prepared in the radiography unit, and a radiation source in radiographing the object; a radiography environment display step of displaying a radiography environment including the positional relationship set in the positional relationship setting step; a ratio calculation step of calculating a ratio of the measurement value to an actual measurement value on the object corresponding to the measurement value by using the positional relationship set in the positional relationship setting step; and a ratio display step of displaying the ratio calculated in the ratio calculation step.

According to the present invention, the foregoing object is attained by providing a computer program which controls an image display apparatus which displays an image of an object radiographed by a radiography unit, comprising: a program code for an image display step of displaying the image; a program code for a measurement step of measuring a distance between positions of two designated points on the image; a program code for a measurement value display step of displaying a measurement value in the measurement step; a program code for a positional relationship setting step of setting a mutual positional relationship between the object, a radiation sensor prepared in the radiography unit, and a radiation source in radiographing the object; a program code for a radiography environment display step of displaying a radiography environment including the positional relationship set in the positional relationship setting step; a program code for a ratio calculation step of calculating a ratio of the measurement value to an actual measurement value on the object corresponding to the measurement value by using the positional relationship set in the positional relationship setting step; and a program code for a ratio display step of displaying the ratio calculated in the ratio calculation step.

According to the present invention, the foregoing object is attained by providing an image display method of displaying an image of an object radiographed by a radiography unit, comprising: an image display step of displaying the image; a radiography environment display step of displaying a radiography environment including a mutual positional relationship between the object, a radiographic plane, and a radiation source in radiographing the object; a positional relationship setting step of setting the mutual positional relationship between the object, the radiographic plane, and the radiation source in radiographing the object; and a magnification calculation step of calculating a magnification of the image to the object by using the positional relationship set in the positional relationship setting step.

According to the present invention, the foregoing object is attained by providing an image display apparatus which displays an image of an object radiographed by a radiography unit, comprising: image display means for displaying the image; radiography environment display means for displaying a radiography environment including a mutual positional relationship between the object, a radiographic plane, and a radiation source in radiographing the object; positional relationship setting means for setting the mutual positional relationship between the object, the radiographic plane, and the radiation source in radiographing the object; and magnification calculation means for calculating a magnification of the image to the object by using the positional relationship set by the positional relationship setting means.

According to the present invention, the foregoing object is attained by providing a computer program which controls an image display apparatus which displays an image of an object radiographed by a radiography unit, comprising: a program code for an image display step of displaying the image; a program code for a radiography environment display step of displaying a radiography environment including a mutual positional relationship between the object, a radiographic plane, and a radiation source in radiographing the object; a program code for a positional relationship setting step of setting the mutual positional relationship between the object, the radiographic plane, and the radiation source in radiographing the object; and a program code for a magnification calculation step of calculating a magnification of the image to the object by using the positional relationship set in the positional relationship setting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view showing the function and operation of a radiographic image display apparatus according to the third embodiment of the present invention;

DETAILED DESCRIPTION OF THE PREFERRED EMBODIMENTS

Preferred embodiments of the present invention will be described in detail in accordance with the accompanying drawings.

First Embodiment

Figure 1:
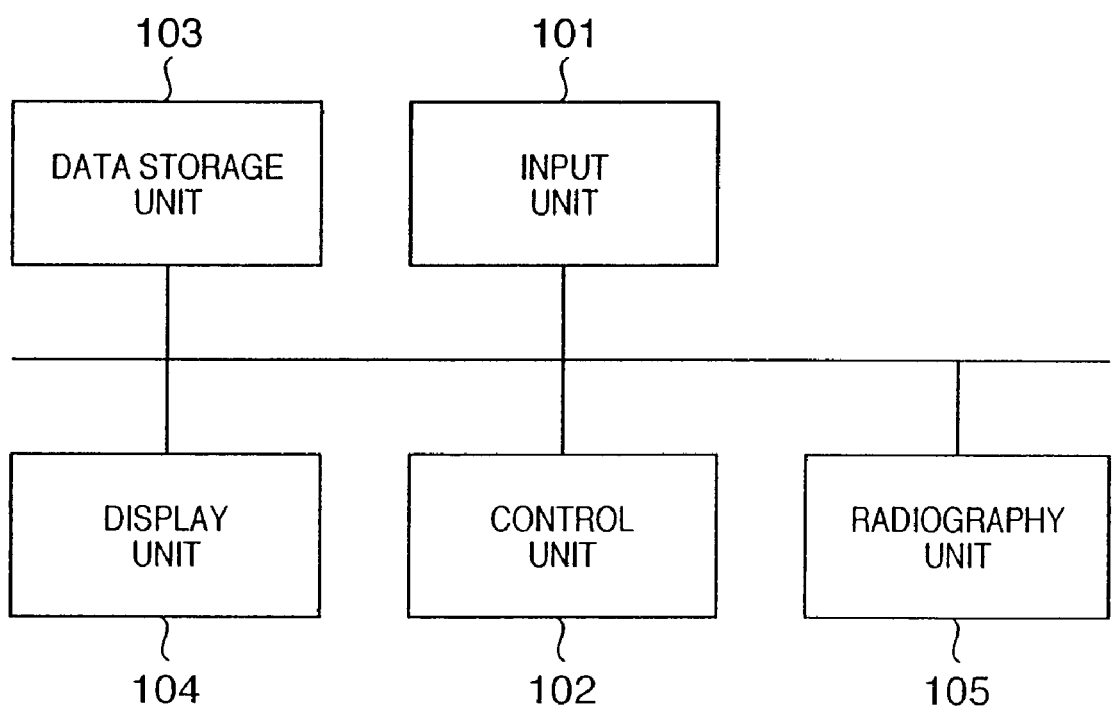
FIG. 1 is a block diagram showing the hardware configuration of a radiographic image display apparatus according to the first embodiment of the present invention.

FIG. 1 is a block diagram for explaining the hardware configuration of a radiographic image display apparatus according to the first embodiment of the present invention.

Referring to FIG. 1, reference numeral 101 denotes an input unit such as a mouse or keyboard which inputs an instruction to a control unit 102. The control unit 102 controls the instruction input from the input unit 101. A data storage unit 103 includes a storage medium such as a hard disk or external storage medium and holds data. A display unit 104 includes a CRT or liquid crystal display and displays data and images. A radiography unit 105 executes radiography (e.g., X-ray imaging) and has a general arrangement (e.g., a radiation generator, a radiation sensor, and the like) for radiography.

The input unit 101, control unit 102, data storage unit 103, display unit 104, and radiography unit 105 are connected to each other.

The functional arrangement of the radiographic image display apparatus according to the first embodiment will be described next with reference to FIG. 2.

Figure 2:
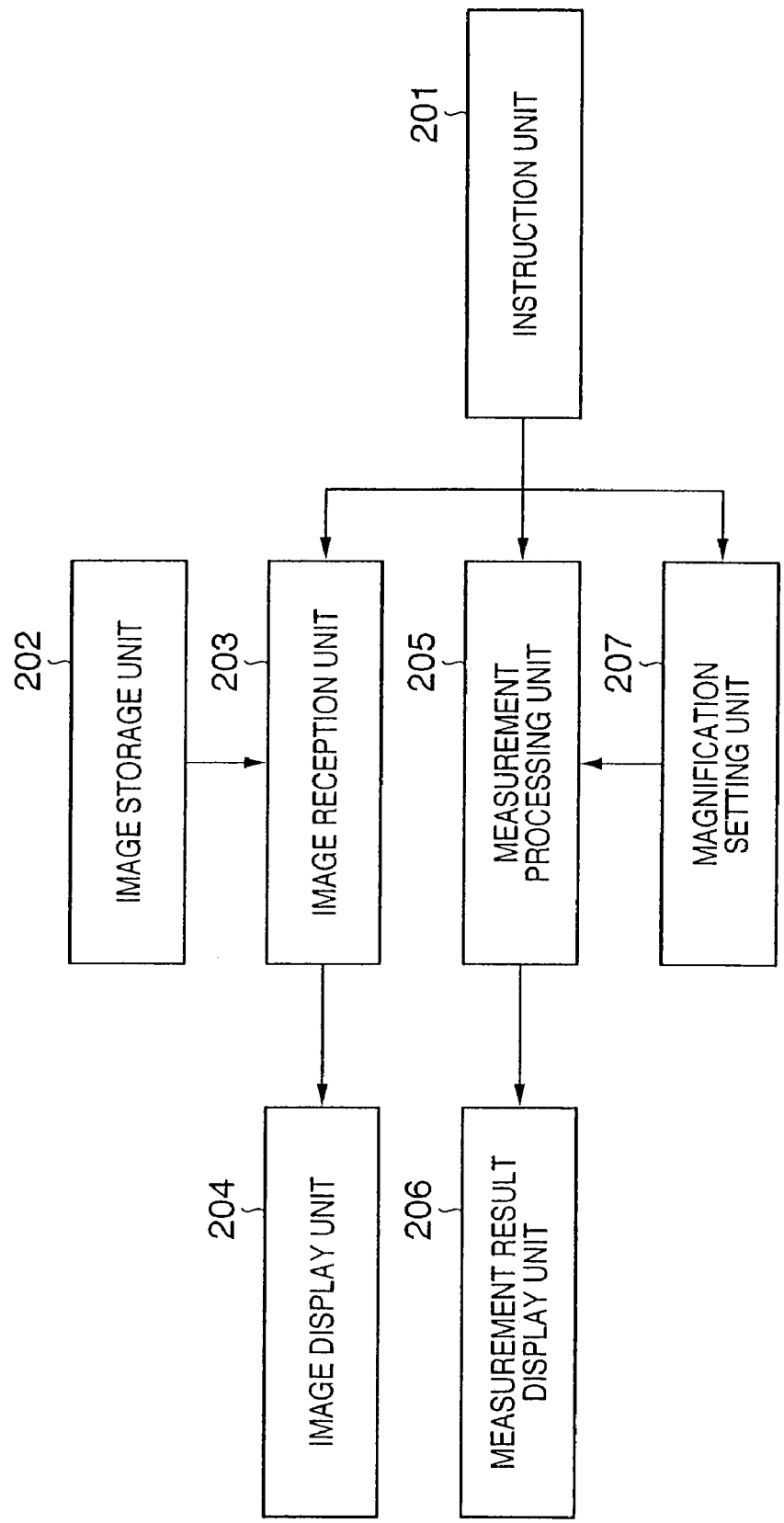
FIG. 2 is a block diagram showing the arrangement of the radiographic image display apparatus according to the first embodiment of the present invention.

FIG. 2 is a block diagram showing the functional arrangement of the radiographic image display apparatus according to the first embodiment of the present invention.

Referring to FIG. 2, an instruction unit 201 gives various kinds of instructions to the radiographic image display apparatus. The instruction unit 201 corresponds to the input unit 101. An image storage unit 202 stores image data obtained by the radiography unit 105 and is included in the data storage unit 103. An image reception unit 203 acquires the image data stored in the image storage unit 202. The image reception unit 203 includes the control unit 102 and programs to be executed by it.

An image display unit 204 displays the image received by the image reception unit 203 on the display unit 104. The image display unit 204 includes the display unit 104 and control unit 102. A measurement processing unit 205 measures the distance between two points on the displayed image in accordance with an input from the input unit 101. A measurement result display unit 206 displays the measurement result on the display unit 104 on the basis of the result obtained by processing by the measurement processing unit 205. A magnification setting unit 207 sets the magnification.

Figure 3:
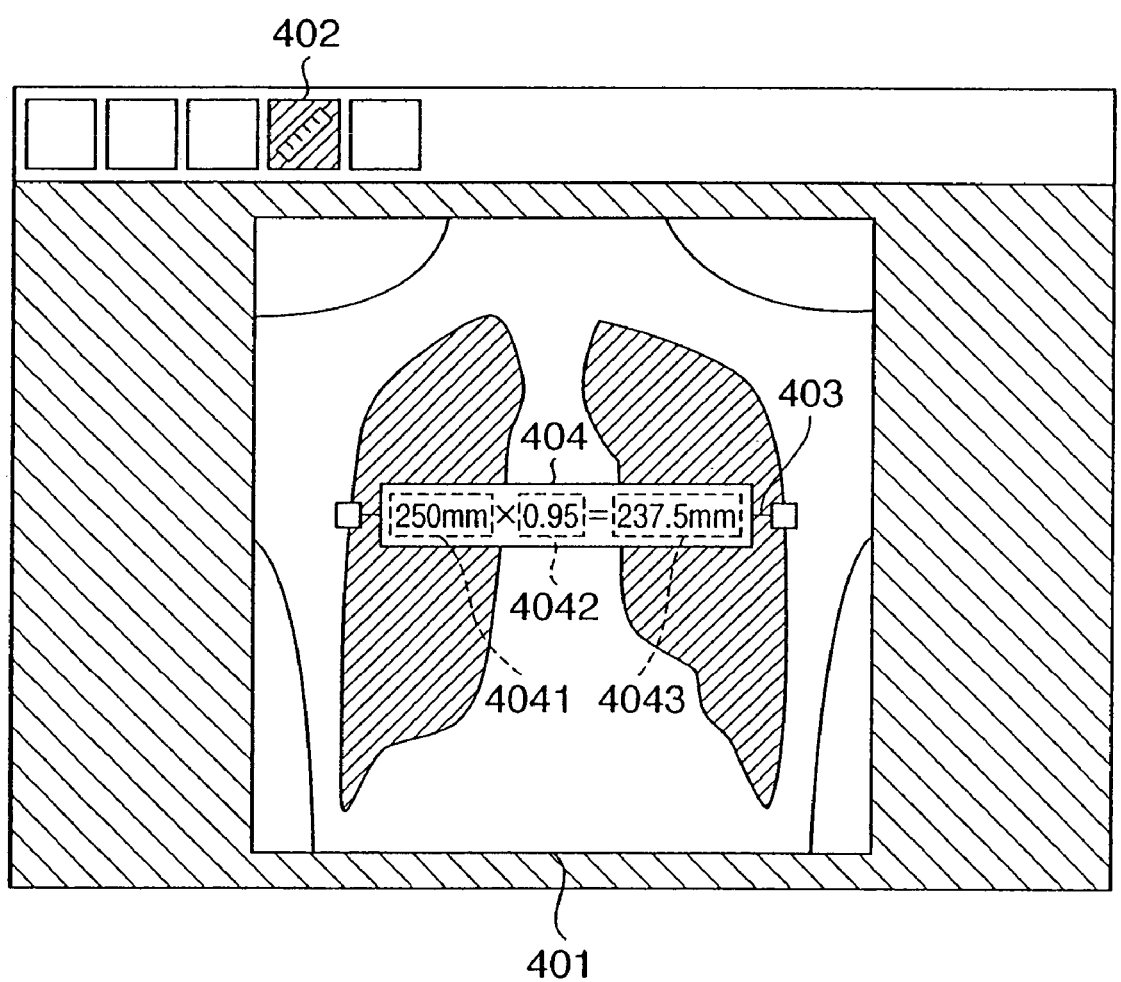
FIG. 3 is a view for explaining display on the radiographic image display apparatus according to the first embodiment of the present invention.

FIG. 3 shows a screen display example of this embodiment. FIG. 3 shows a state wherein measurement processing is being executed for a radiographic image displayed on the display. First, the user displays a desired image. Only one radiographic image 401 is illustrated in FIG. 3 as the image to be diagnosed by the diagnostician. However, a plurality of images may be displayed.

Various kinds of tool buttons are displayed as GUI (Graphical User Interface) to instruct execution of predetermined operations on the radiographic image 401. For example, when a button for measurement processing is clicked on by using a pointing device such as a mouse, measurement processing can be performed.

First, the pointer is moved onto the radiographic image 401 by using the mouse. The magnification of the image is set by, e.g., clicking a button of the mouse. This operation will be described later in detail.

After setting the magnification, a button 402 serving as a measurement tool selection unit is displayed on the screen. The pointer is moved onto the button 402 by operating the mouse and clicked on to instruct the system to execute measurement processing. Accordingly, the display form of the button 402 changes to explicitly indicate the change to the measurement mode.

Two arbitrary points on the image are designated by operating the mouse, and the distance between the two thus designated points is measured. In addition, the two designed points are connected by a line, and the measurement value, magnification, and actual measurement value are displayed. The measurement value, magnification, and actual measurement value are preferably displayed near or on the line from the viewpoint of visibility.

Reference numeral 403 denotes a line that connects the two designated points; and 404, a measurement result display potion. A measurement value 4041 on the radiographic image 401, a set magnification 4042, and an actual measurement value 4043 on the object calculated by using the magnification are displayed on the measurement result display portion 404. The relational expression between them is also displayed. In the example shown in FIG. 3, the magnification is set to 95%.

In this embodiment, only the tool to instruct measurement processing is displayed. Additionally, buttons to instruct general processing for radiographic images such as enlargement/reduction, contrast adjustment, and frequency enhancement are displayed. However, they are not directly relevant to the present invention, and a description thereof will be omitted.

Let $P_x$ be the X-axis pixel pitch of the radiation sensor, $P_y$ be the Y-axis pixel pitch, and $(x_1, y_1)$ and $(x_2, y_2)$ be the positions of two points on the radiation sensors. In this case, the measurement value 4041 is given by $$\sqrt{P_x^2(x_1 - x_2)^2 + P_y^2(y_1 - y_2)^2}$$

Assume that the pixel pitch of the radiation sensor is $P_x = P_y = 160$ μm, and the positions of two points on the sensor are indicated by (200,300) and (400,600). Then, the measurement value is given by $$\sqrt{(0.16)^2(200-400)^2 + (0.16)^2(300-600)^2} = 57.7 \text{ (mm)}$$

Figure 4:
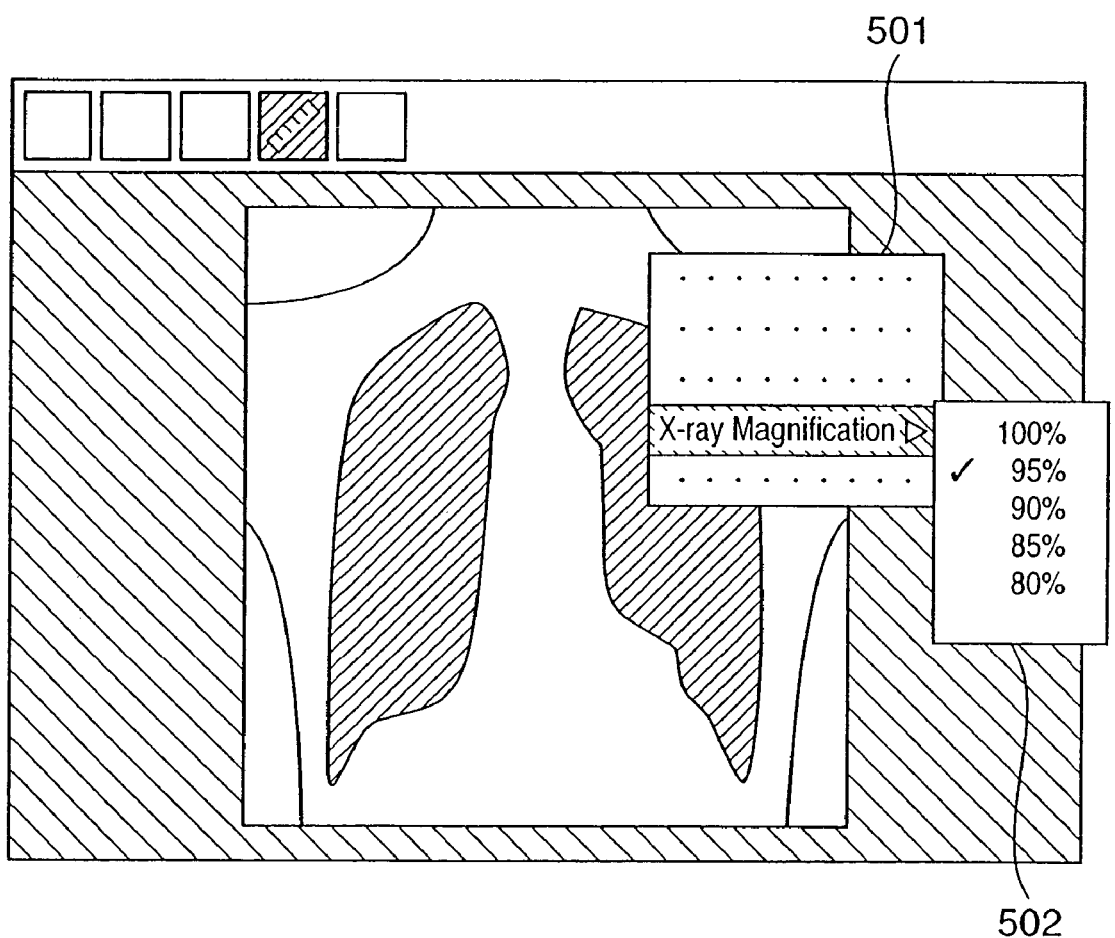
FIG. 4 is a view for explaining a magnification setting method of the radiographic image display apparatus according to the first embodiment of the present invention.

FIG. 4 is a view for explaining a magnification setting method.

Reference numeral 501 denotes a pop-up menu. The pointer is moved onto the radiographic image 401 by using the mouse. The pop-up menu 501 is displayed by, e.g., clicking the right button of the mouse. An item for magnification setting is selected from the pop-up menu 501. A desired magnification is selected from an additionally displayed magnification setting window 502, thereby setting the magnification.

Alternatively, a magnification setting button having a button form, like the button 402, may be displayed. A magnification setting widow is displayed by clicking on that button to set the magnification.

Once the magnification is set, the actual measurement value is calculated by subsequent measurement processing on the basis of the newly set magnification. For a portion which has been measured before the magnification setting, re-calculation of the actual measurement value on the object based on the new magnification is not executed. That is, when the magnification is changed, it is applied to only measurement after the change. The changed magnification is not retroactively applied to measurement in the past.

The operation of the radiographic image display apparatus according to the first embodiment will be described next with reference to FIG. 5.

Figure 5:
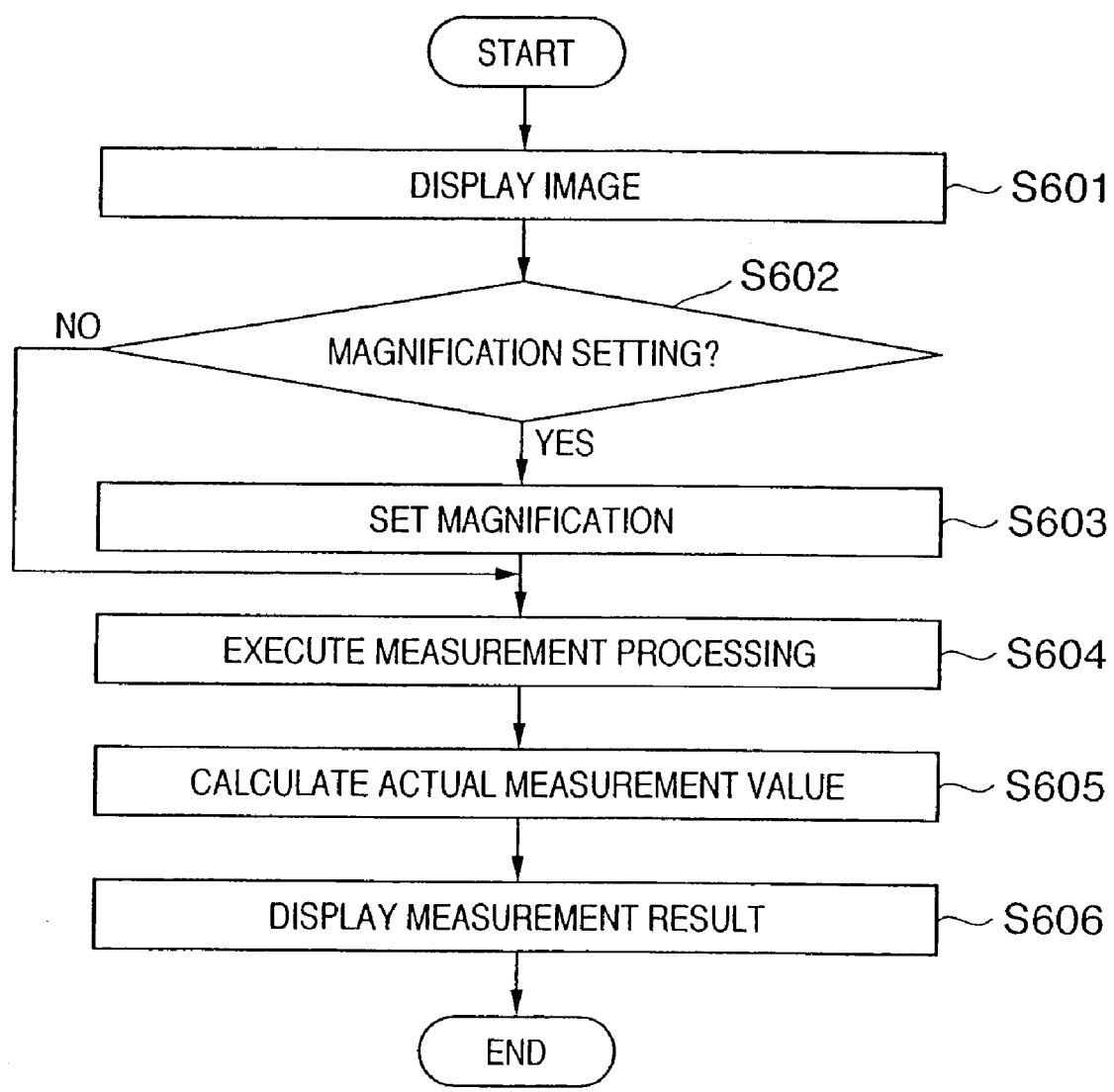
FIG. 5 is a flowchart showing the operation of the radiographic image display apparatus according to the first embodiment of the present invention.

FIG. 5 is a flowchart showing the operation of the radiographic image display apparatus according to the first embodiment of the present invention.

FIG. 5 shows the operation flow from the measurement operation for an image until display of the measurement result. Any other operation for the image is not illustrated.

First, in step S601, the operator inputs a patient ID, or patient information is input from the instruction unit 201 by using, e.g., a card reader. On the basis of the input patient information, the image reception unit 203 reads out image data from the image storage unit 202. The image display unit 204 displays an image on the basis of the image data. Step S602 is a conditional branch to select whether a magnification is to be set. If YES in step S602, the flow advances to step S603. If NO in step S602, the flow advances to step S604.

If YES in step S602, the magnification setting unit 207 sets the magnification in step S603. The magnification is set by the above-described method. That is, the pop-up menu 501 is displayed by, e.g., clicking the right button of the mouse on the radiographic image, and the magnification is selected from the magnification setting window 502.

When magnification setting is ended, the flow advances to step S604. In step S604, the measurement tool displayed on the screen is selected to change the mode to the measurement mode. After that, two arbitrary points on the image are designated by operating the mouse. The measurement processing unit 205 executes measurement processing for obtaining the distance between the two designated points. When the measurement processing is executed, the measurement processing unit 205 calculates the actual measurement value on the object in step S605.

The actual measurement value on the object is calculated by using the magnification set in step S603. If NO in step S602, the actual measurement value is calculated by using a specified magnification that is set in advance.

In step S606, the measurement result display unit 206 draws a line which connects the two designated points. In addition, the measurement result display unit 206 displays the measurement value on the image obtained in step S604, the actual measurement value on the object calculated in step S605, and the set magnification near the line that connects the two designated points as a measurement result.

Modification to First Embodiment

In the first embodiment, a desired magnification is selected from predetermined magnifications in the magnification setting window 502 shown in FIG. 4. However, an arbitrary magnification can also be input in magnification setting. For example, "arbitrary magnification" is prepared as an item in the magnification setting window. When the "arbitrary magnification" is selected, a value input by the user from the keyboard can be set as the magnification. Alternatively, an arbitrary magnification may be set by using a slide bar. When a magnification is set in this way, the user can set an arbitrary magnification.

As another arbitrary magnification setting method, a reference object having a predetermined size (e.g., a ruler) is radiographed together with the object. When the size of the reference object in the radiographic image obtained by radiography is measured, the magnification can be set.

Figure 6B:
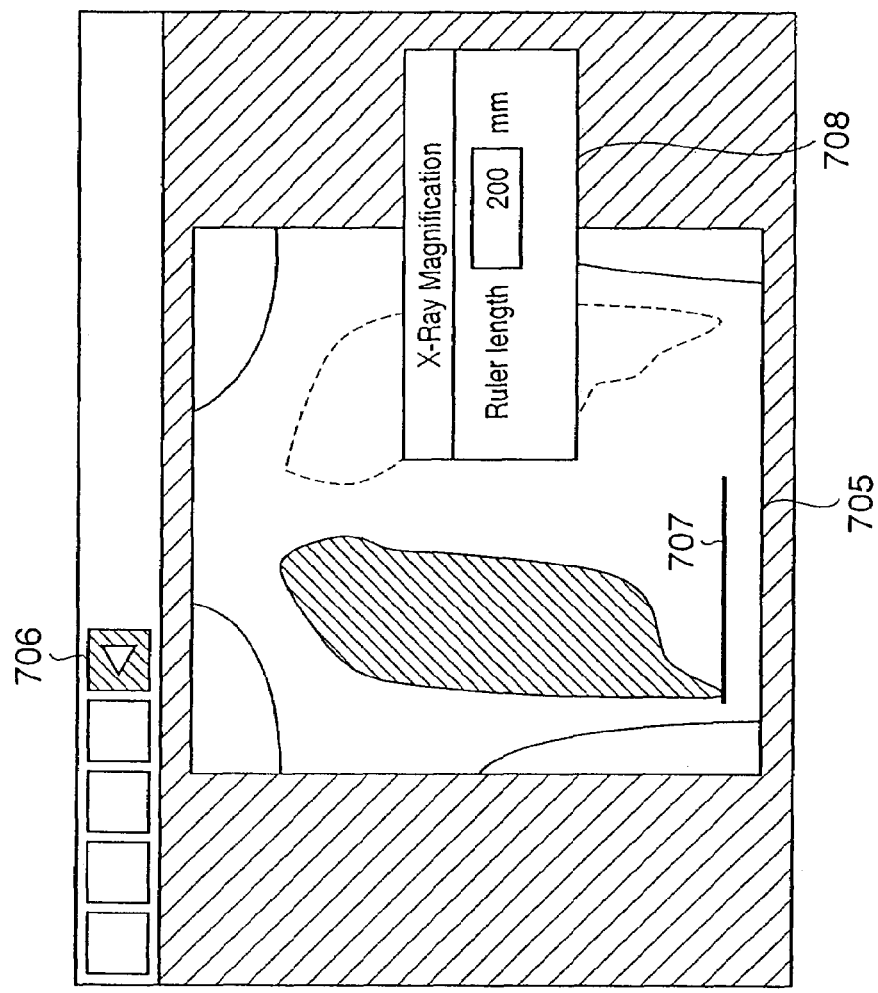
FIGS. 6A and 6B are views for explaining a display method in a modification to the first embodiment of the present invention.

This will be described in detail with reference to FIGS. 6A and 6B.

Figure 6A:
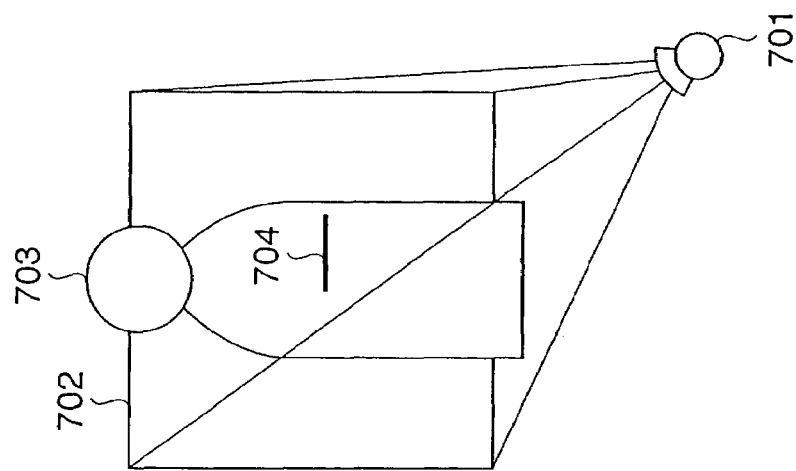

Referring to FIG. 6A, reference numeral 701 denotes a tube; 702, a radiation sensor; 703, an object; and 704, a reference object to be sensed together with the object. FIG. 6B shows a display example of the image radiographed by the method shown in FIG. 6A. Reference numeral 705 denotes a radiographed image; 706, a tool button to instruct execution of reference object measurement processing and magnification setting; 707, a reference object radiographed in the image; and 708, a dialog box in which the length of the reference object on the image is input.

First, the operator instructs execution of reference object measurement processing by clicking on the tool button 706 at the upper portion of the screen. When the positions of the two ends of the reference object 704 are input by operating the mouse, the length of the reference object on the image is measured. When this measurement is ended, the dialog box in which the actual reference object length is to be input is displayed.

When the actual length of the reference object, which is known in advance, is input, the magnification is calculated from the actual length of the reference object and the measurement value on the screen, and the calculated magnification is set. Assume that the actual reference object length is 20 cm, and the measurement value on the screen is 21 cm. In this case, the magnification is given by $$\frac{20}{21} \times 100 = 95.2(\%)$$

The magnification is set to 95.2%.

When this magnification setting method is employed, the magnification can easily and accurately be set.

As described above, according to the first embodiment, the magnification set by the magnification setting unit serving as a magnification setting means, the distance (measurement value) between two designated points on the image, which is calculated by the measurement processing unit serving as a measurement means, and the distance (actual measurement value) on the object corresponding to the image, which is calculated by the measurement processing unit also serving as a calculation means are simultaneously displayed. Accordingly, comparison between the measurement value on the image and the actual object size (actual measurement value) or the relationship to the magnification can reliably be grasped at a glance. Hence, a user-friendly radiographic image display apparatus can be provided.

The magnification set by the magnification setting unit is used only in the subsequent calculation of the actual measurement value. For this reason, comparison between the measurement value on the image and the actual object size or the relationship to the magnification can be recognized without any cumbersomeness. Hence, a user-friendly radiographic image display apparatus can be provided.

Second Embodiment

The functional arrangement of the radiographic image display apparatus according to the second embodiment of the present invention will be described next with reference to FIG. 7.

Figure 7:
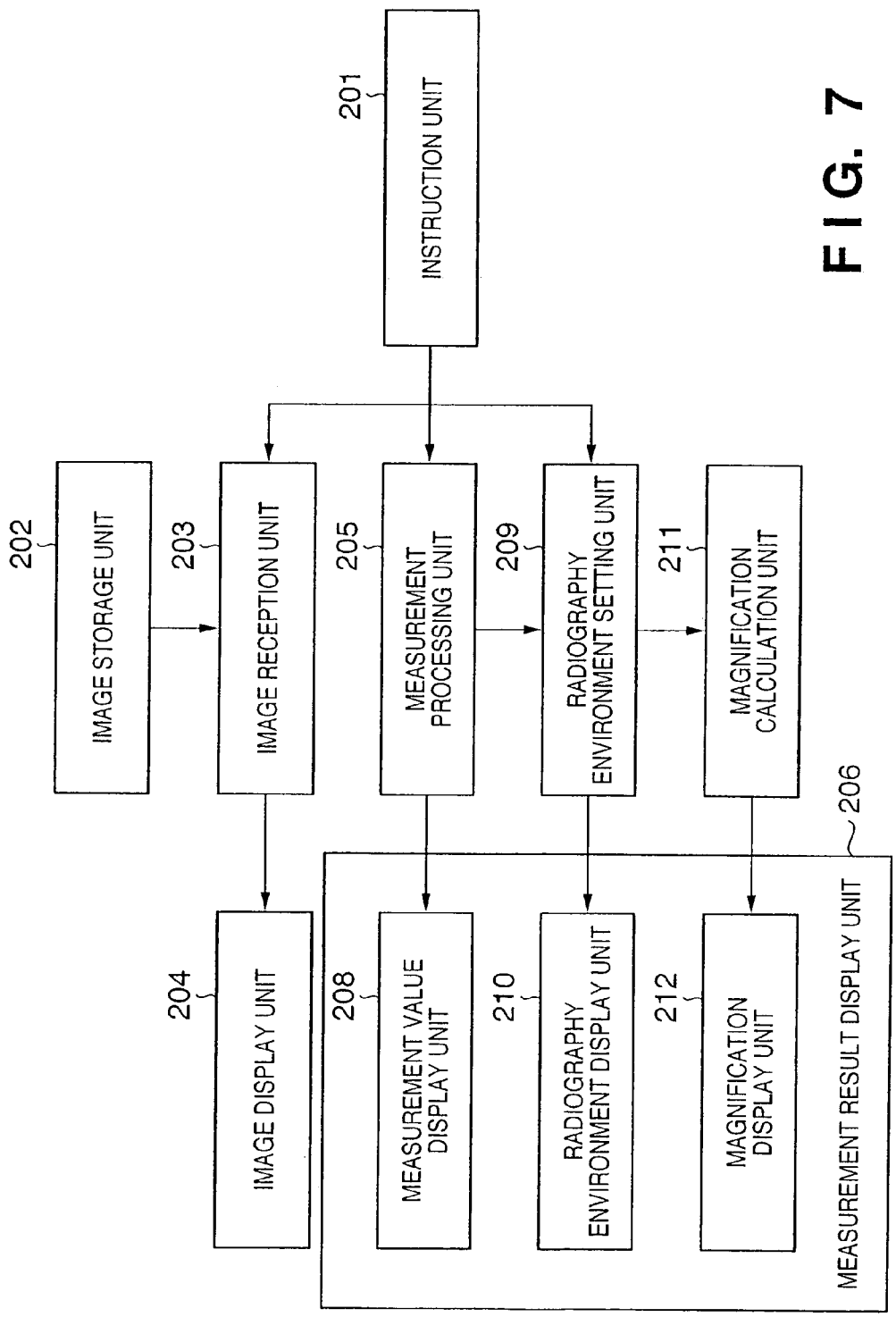
FIG. 7 is a block diagram showing the functional arrangement of a radiographic image display apparatus according to the second embodiment of the present invention.

FIG. 7 is a block diagram showing the functional arrangement of the radiographic image display apparatus according to the second embodiment of the present invention.

The same reference numerals as in FIG. 2 of the first embodiment denote the same constituent elements in FIG. 7, and a detailed description will be omitted.

In the second embodiment, a measurement value display unit 208, radiography environment display unit 210, magnification display unit 212, radiography environment setting unit 209, and magnification calculation unit 211 are arranged in addition to an instruction unit 201, image storage unit 202, image reception unit 203, image display unit 204, and measurement processing unit 205 of the first embodiment. The measurement value display unit 208, radiography environment display unit 210, and magnification display unit 212 function as a measurement result display unit 206.

The measurement value display unit 208 includes, e.g., a display unit 104 and control unit 102 and displays a measurement value obtained by measurement by the measurement processing unit 205.

The radiography environment setting unit 209 includes, e.g., the control unit 102. The radiography environment setting unit 209 sets the radiography environment such as the distance between the radiation generator (tube) and the object and the distance between the object and the radiation senor on the basis of an instruction input from an input unit 101.

The radiography environment display unit 210 includes, e.g., the display unit 104 and control unit 102 and displays the radiography environment set by the radiography environment setting unit 209. Hence, when the operator operates the input unit 101 while visually recognizing the radiography environment displayed on the radiography environment display unit 210, the radiography environment setting unit 209 sets a new radiography environment in accordance with this operation. The setting result is displayed on the radiography environment display unit 210 any time.

For this reason, the operator can select a desired radiography environment while visually recognizing the contents displayed on the measurement value display unit 208. The radiography environment means the radiation source in radiographing an object, the positional relationship between the object and the radiation sensor which receives radiation, and the posture and direction of the object at the time of radiography.

The magnification calculation unit 211 includes, e.g., the control unit 102 and calculates the magnification (enlargement or reduction ratio) of an image on the basis of the contents set by the radiography environment setting unit 209. The magnification display unit 212 includes, e.g., the display unit 104 and control unit 102 and displays the value calculated by the magnification calculation unit 211.

To explain the characteristic feature of display in the radiographic image display apparatus according to the second embodiment, a display example of a conventional radiographic image display apparatus will be described with reference to FIG. 15.

Figure 15:
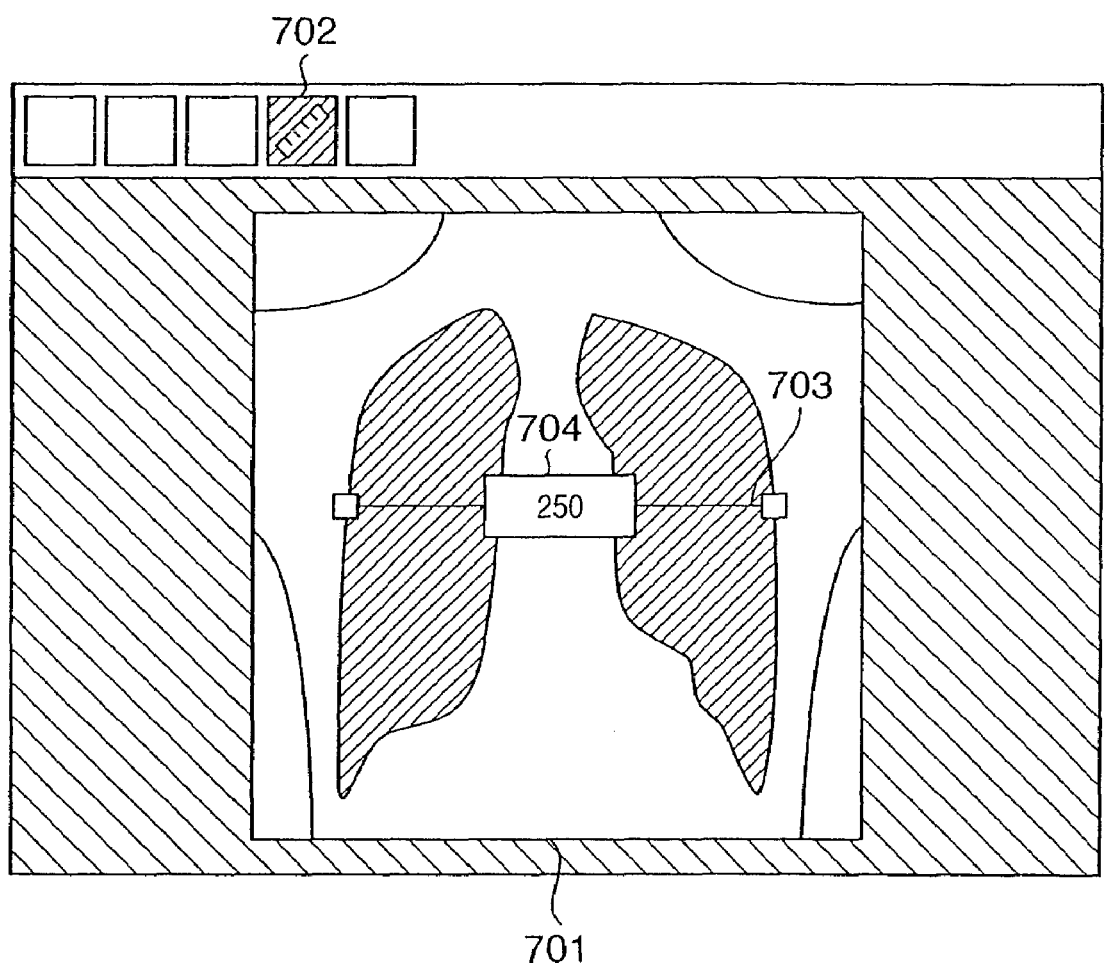
FIG. 15 is a schematic view showing an example of display in a conventional X-ray image display apparatus.

FIG. 15 is a schematic view showing an example of display in a conventional X-ray image display apparatus.

As shown in FIG. 15, in the conventional radiographic image display apparatus, a radiographic image 701 to be diagnosed by the diagnostician is displayed on the display. In addition, various kinds of tool buttons are displayed as GUI (Graphical User Interface) to instruct execution of predetermined operations on the radiographic image 701.

For example, when a button for measurement processing is clicked on by the operator using a pointing device such as a mouse, measurement processing can be performed. As such a button, a measurement tool 702 is displayed in the example shown in FIG. 15.

When the operator instructs the radiographic image display apparatus to execute measurement processing by, e.g., clicking on the measurement tool 702, two arbitrary points on the radiographic image can be designated. In this state, the operator designates two arbitrarily selected points. The radiographic image display apparatus measures the distance between the two points, connects the two designated points by a line segment 703, and displays the measurement value in a measurement value display frame 704.

In the example shown in FIG. 15, the measurement value of the length of the chest measured by the operator is 250 mm. This numerical value indicates the length in the image on the sensor. No accurate length in the object (the actual measurement value of the internal tissue) can be obtained.

Unlike the conventional radiographic image display apparatus, in the second embodiment, not only the length (measurement value) in the image on the radiation sensor but also the ratio (magnification) of the length (measurement value) of the image to the actual length (actual measurement value) is displayed. In addition, a separate window which indicates the radiography environment is also displayed.

Figure 8:
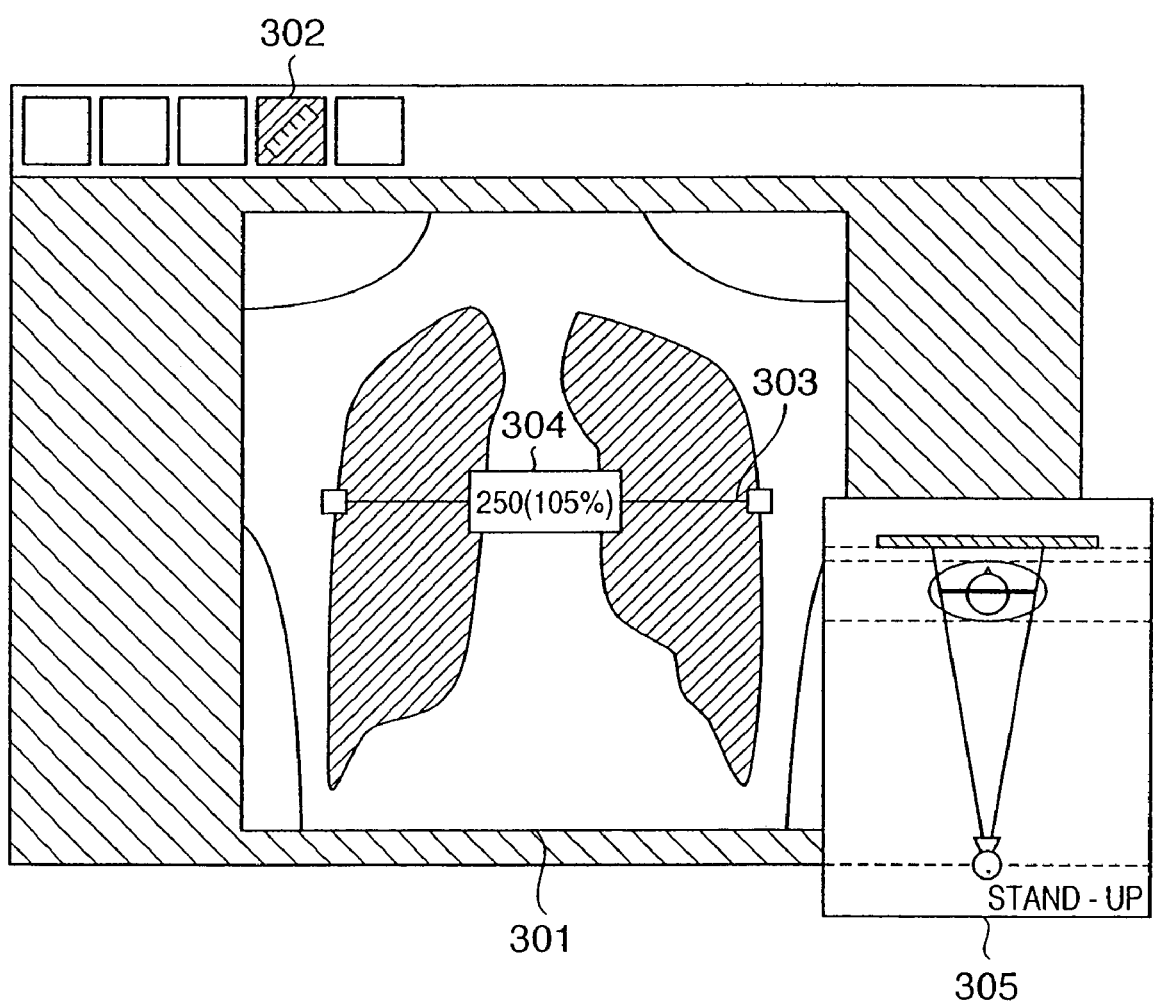
FIG. 8 is a view for explaining display on the radiographic image display apparatus according to the second embodiment of the present invention.

FIG. 8 is a view showing a screen display example of the second embodiment of the present invention.

As shown in FIG. 8, in the radiographic image display apparatus according to this embodiment, the image display unit 204 displays a radiographic image 301. The measurement value display unit 208 displays a line segment 303 and measurement value display frame 304. The radiography environment display unit 210 displays a radiography environment window 305. In the measurement value display frame 304, the measurement value display unit 208 displays the measurement value, and additionally, the magnification display unit 212 displays the ratio (magnification) of the length (measurement value) in the image on the radiation sensor to the actual length (actual measurement value). In the radiography environment window 305, the radiography environment display unit 210 displays the radiography environment such as the positional relationship between the tube, the object, and the sensor. As in the conventional radiographic image display apparatus, a measurement tool 302 is displayed as GUI. Although not illustrated, buttons to instruct general processing for X-ray images such as enlargement/reduction, contrast adjustment, and frequency enhancement are preferably displayed as GUI.

The radiography environment window 305 can be displayed as a pop-up window on the screen or may be displayed in the window where the image is displayed. A plurality of radiographic images 301 to be diagnosed by the diagnostician may be displayed on the screen.

The contents in the radiography environment window 305 will be described next with reference to FIGS. 9A to 9D.

Figure 9A:
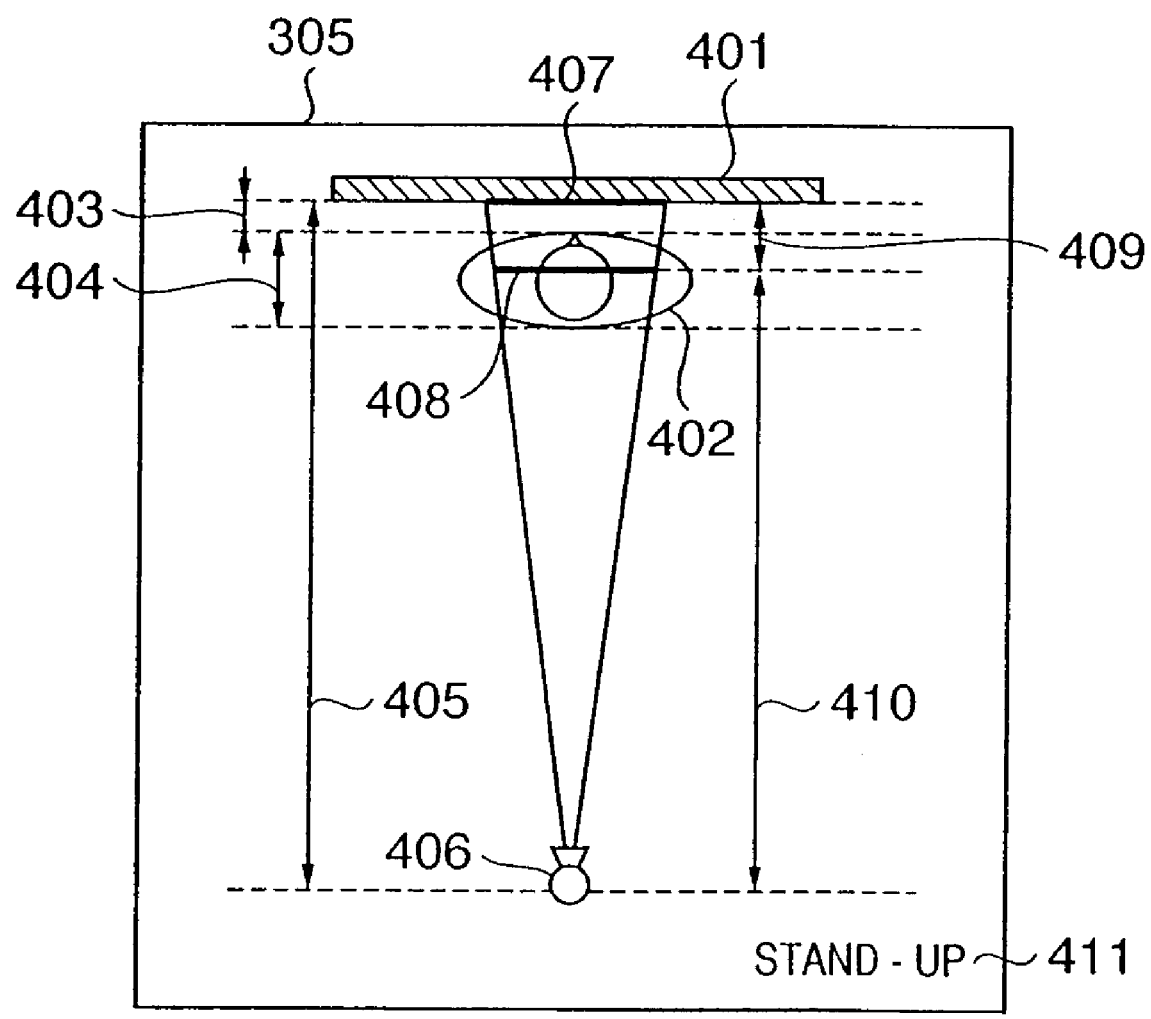
FIG. 9A is a view showing the structure of a radiography environment window according to the second embodiment of the present invention.

FIG. 9A is a view showing the structure of the radiography environment window 305.

As shown in FIG. 9A, a radiation sensor 401 which receives radiation (e.g., X-rays), an object 402, a tube (radiation source) 406, a distance 403 between the radiation sensor 401 and the object 402, an object thickness 404 representing the thickness of the object 402, a distance 405 between the radiation sensor 401 and the tube 406, a length 407 measured in the image on the radiation sensor 401, a measurement region 408 to be actually measured, a distance 409 between the radiation sensor 401 and the measurement region 408, a distance 410 between the measurement region 408 and the tube 406, and a radiography posture display portion 411 are displayed in the radiography environment window 305.

The radiography posture display portion 411 indicates, e.g., the posture of the object 402 at the time of radiography and the display direction of the radiography environment window 305 viewed from the radiation sensor 401 (the display direction of the radiography environment).

More specifically, "stand" in FIG. 9A indicates that radiography is executed in a standing state of the object 402, and "up" indicates that, in this radiography environment, the line which connects the radiation sensor 401 and tube 406 is viewed from the upper side of the radiation sensor 401.

Figure 9B:
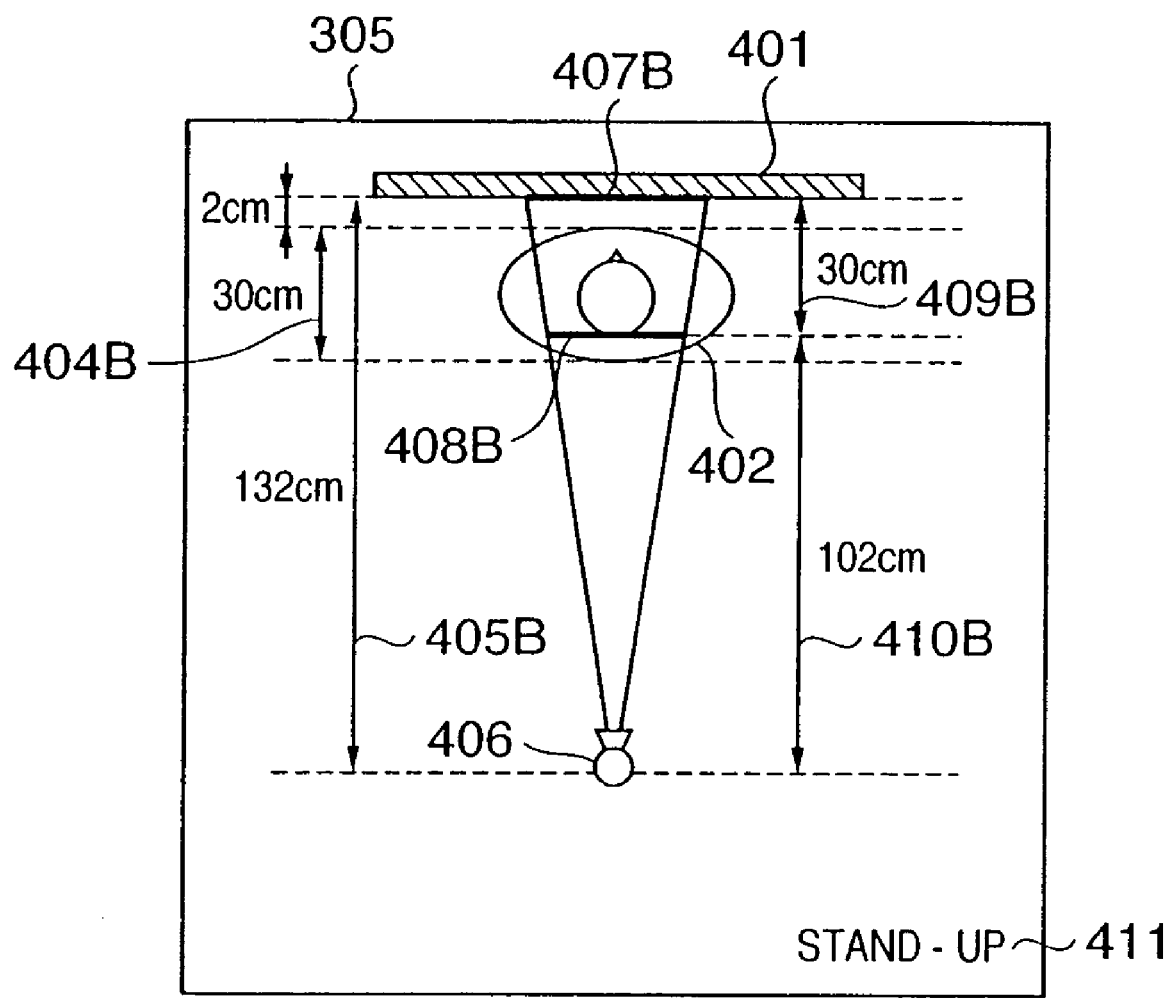
FIG. 9B is a view showing the radiography environment window for a certain radiography environment in the second embodiment of the present invention.
Figure 9C:
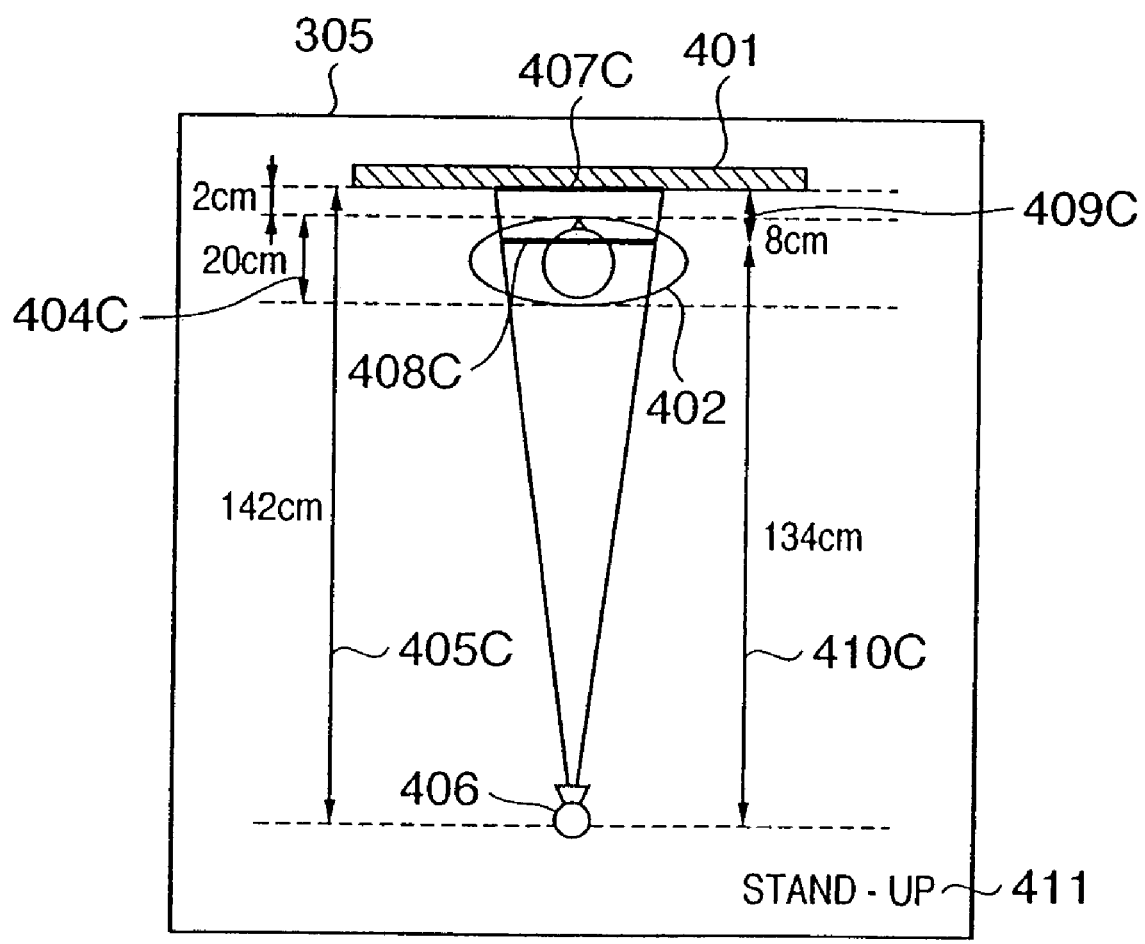
FIG. 9C is a view showing the radiography environment window for a radiography environment different from that shown in FIG. 9B in the second embodiment of the present invention.

FIG. 9B is a view showing the radiography environment window for a certain radiography environment. FIG. 9C is a view showing the radiography environment window for a radiography environment different from that shown in FIG. 9B. The radiography environment shown in FIG. 9B and that shown in FIG. 9C have different (1) object thicknesses 404 (404B and 404C),
(2) distances 405 (405B and 405C) between radiation sensor 401 and tube 406,
(3) distances 409 (409B and 409C) between radiation sensor 401 and measurement regions 408 (408B and 408C), and
(4) distances 410 (410B and 410C) between measurement region 408 and tube 406.

To the contrary, the lengths 407 (407B and 407C) in the images are the same because of the following reason. The radiography environment setting unit 209 has a function of increasing/decreasing the width of the measurement region on the basis of an instruction input from the instruction unit 201 such that the length 407 in the image becomes constant. With this function, the radiography environment setting unit 209 adjusts the width of the measurement region.

For example, when the measurement region 408B is moved toward the sensor 401 in the radiography environment shown in FIG. 15, the radiography environment setting unit 209 increases the length of the measurement region 408B. When the measurement region 408B is moved toward the tube 406, the radiography environment setting unit 209 decreases the length of the measurement region 408B.

More specifically, there are two intersections between the radiation sensor 401 and lines extending from the tube 406 to the end points of the measurement region 408B. The radiography environment setting unit 209 increases/decreases the width of the measurement region 408B such that the length (the mapping length 407B) of the line segment which connects the two points always becomes constant. This control is done even in the radiography environment shown in FIG. 9C.

The measurement region 408 can also be moved to an arbitrary position. Instead, a limitation may be posed to allow movement only inside the object 402. More specifically, when movement is permitted only within the distance range designated by the object thickness 404, the measurement region can be prevented from being set outside the object 402.

The various distances (numerical values) displayed in the radiography environment window 305 can be changed by changing the position of the radiation sensor 401 by dragging the mouse. The displayed numerical values can also be changed by directly editing them by using the keyboard. The position of the measurement region 408 (408B and 408C) can also be moved by dragging the mouse.

At the radiography posture display portion 411, "recumbent" may be displayed as the radiography posture, or "down", "left", or "right" may be displayed as the display direction, in place of "stand" and "up" shown in FIGS. 9A to 9C. As described above, the display direction indicates the direction of the radiation sensor 401 from which the line connecting the radiation sensor 401 and tube 406 is viewed in the radiography environment.

That is, the display direction is defined on the basis of directions specified for the radiation sensor 401 ("up", "down", "left", and "right" in the second embodiment).

Figure 9D:
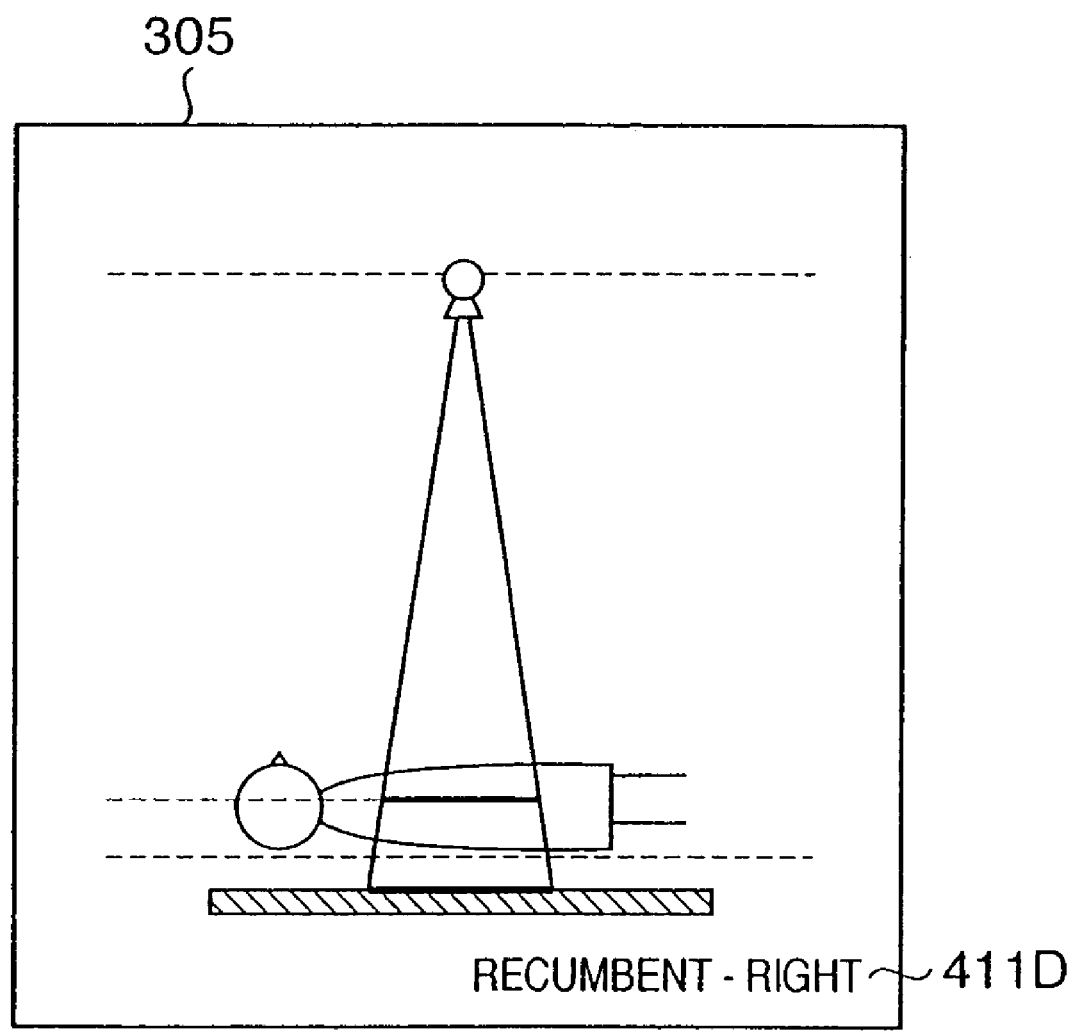
FIG. 9D is a view showing an example of the display direction displayed in a radiography posture display unit according to the second embodiment of the present invention.

For example, as shown in FIG. 9D, when radiography is executed in a recumbent state, and the display direction is "right" when viewed from the reference direction of the radiation sensor 401, i.e., the radiation sensor 401 is viewed from the right, "recumbent-right" is displayed at a radiography posture display portion 411D.

The radiography posture can be acquired as collateral information of the displayed image. It may be determined when the image to be displayed is determined. Alternatively, the operator may manually select the radiography posture.

Referring to FIGS. 9A to 9D, the display direction of the radiography environment is specified to one of "up", "down", "left", and "right" on the basis of the directions specified for the radiation sensor 401. Any other reference can be used if the display direction can be specified.

The ratio of the length in the image on the radiation sensor to the actual length in the object will be described next. As examples of the ratio, an enlargement ratio and a reduction ratio will be described.

An enlargement ratio is a value that represents the degree of enlargement of the length (measurement value) 407 in the image on the radiation sensor from the length (actual measurement value) on the actual measurement region 408.

On the other hand, a reduction ratio is a value that represents the degree of reduction of the length (measurement value) 407 on the measurement region 408 from the length (measurement value) 407 in the image on the radiation sensor. In the example shown in FIG. 9B, the distance 409B between the radiation sensor and the measurement region is 30 cm, and the distance 410B between the tube and the measurement region is 102 cm. Hence, the enlargement ratio and reduction ratio are given by $$\frac{102+30}{102} \times 100 = 129.4(\%)$$

$$\frac{102}{102+30} \times 100 = 77.3(\%)$$

In the example shown in FIG. 9C, the distance 409C between the radiation sensor and the measurement region is 8 cm, and the distance 410C between the tube and the measurement region is 134 cm. Hence, the enlargement ratio and reduction ratio are given by $$\frac{134+8}{134} \times 100 = 106.0(\%)$$

$$\frac{134}{134+8} \times 100 = 94.4(\%)$$

These are examples of the method of obtaining the ratios. A method of obtaining the ratio of the length (measurement value) in the image on the radiation sensor to the length (actual measurement value) in the object is not limited to the above-described methods.

The operation of the radiographic image display apparatus according to the second embodiment will be described next with reference to FIG. 10.

Figure 10:
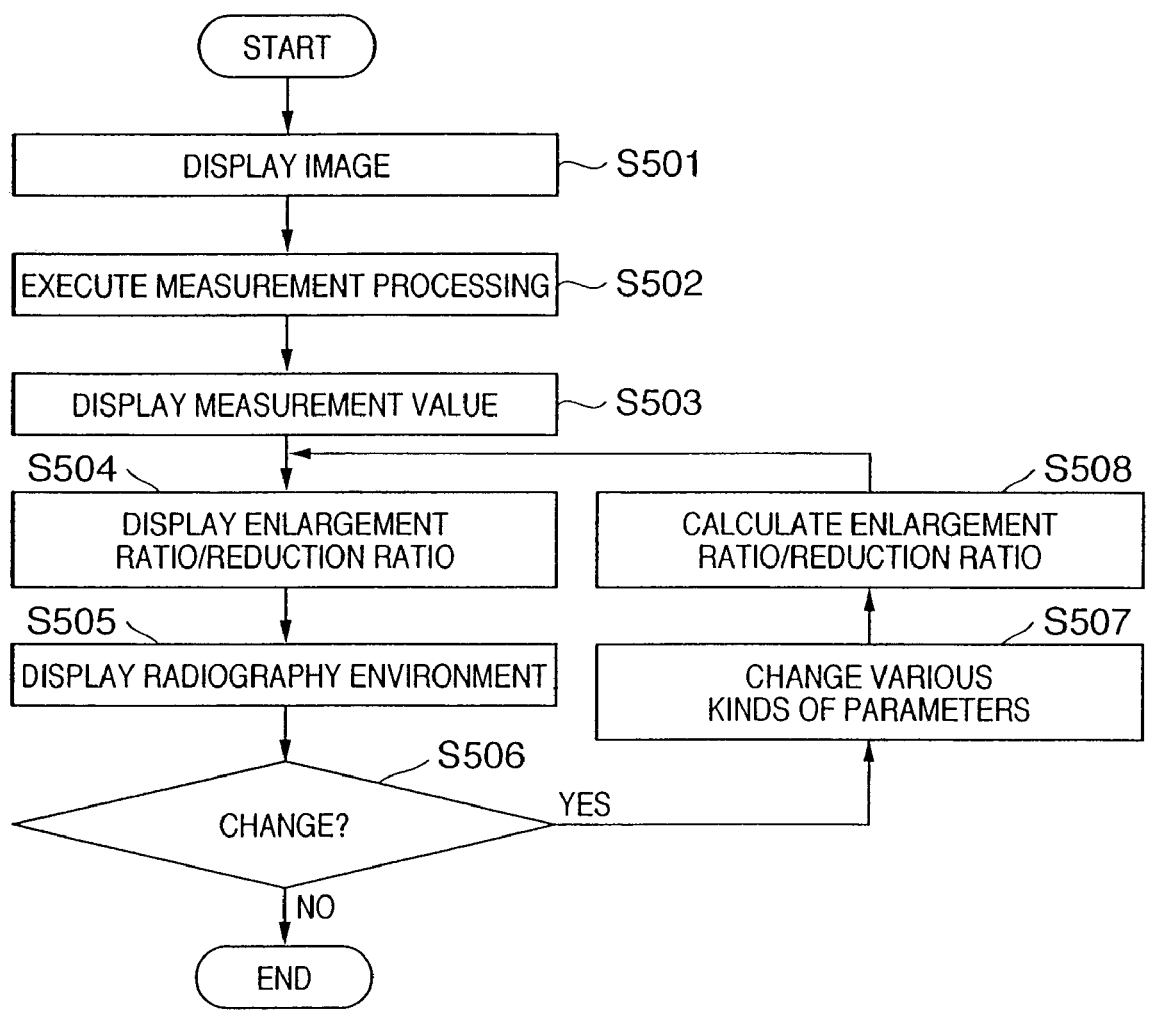
FIG. 10 is a flowchart showing the operation of the radiographic image display apparatus according to the second embodiment of the present invention.

FIG. 10 is a flowchart showing the operation of the radiographic image display apparatus according to the second embodiment of the present invention.

FIG. 10 shows the flow related to display of the enlargement ratio or reduction ratio when the measurement operation for an image has been executed. Any other operation for the image is not illustrated.

First, in step S501, the operator inputs a patient ID, or patient information is input from the instruction unit 201 by using, e.g., a card reader. On the basis of the input patient information, the image reception unit 203 reads out image data from the image storage unit 202. The image display unit 204 displays an image on the basis of the image data.

In step S502, the operator selects the measurement tool displayed on the screen, selects portions (two arbitrary points) to be measured, and inputs a measurement processing instruction from the instruction unit 201. Accordingly, the measurement processing unit 205 starts measurement processing.

In step S503, the measurement value display unit 208 displays the measurement value obtained by the measurement processing unit 205.

In addition, on the basis of the radiography environment set in advance by the radiography environment setting unit 209, the magnification calculation unit 211 calculates the enlargement ratio or reduction ratio. The magnification display unit 212 displays it in step S504. In step S505, the radiography environment display unit 210 displays the radiography environment in the radiography environment window 305.

It is determined in step S506 whether a radiography environment change instruction is input by the operator. If a radiography environment change instruction is input (YES in step S506), the operator is requested to change various kinds of parameters such as the positions and display direction of the radiation sensor, object, and tube on the screen so that a new radiography environment is set.

In step S508, the magnification calculation unit 211 calculates the enlargement ratio or reduction ratio on the basis of the various kinds of parameters changed in step S507. In step S504, the magnification display unit 212 displays the value calculated in step S508 in place of the enlargement ratio or reduction ratio displayed so far.

The radiography environment displayed for the first time in step S505 is indicated by specified values (initial values) and set in advance. If the displayed radiography environment need not be changed, i.e., no change instruction is input (NO in step S506), the processing directly shifts to another operation. Hence, the measurement operation is ended.

As described above, according to the second embodiment, not only the measurement value but also the enlargement ratio or reduction ratio is displayed as a ratio in the measurement value display frame 304. In addition, the radiography environment at that time is also displayed. Hence, the actual size between two points in the measurement region 408 can easily be obtained.

Third Embodiment

The third embodiment of the present invention will be described next.

When the measurement region tilts in a radiographic image 301, a measurement region 408 displayed in a radiography environment window 305 may be extremely short depending on the tilt angle and display direction. In such a case, it may be difficult to change the radiography environment. The third embodiment has a function of preventing the difficulty in operation.

FIG. 11 is a view showing the function and operation of a radiographic image display apparatus according to the third embodiment of the present invention.

For example, in the third embodiment, when two points are designated in measurement processing, the angle made by the line segment connecting the two designated points and the vertical direction is obtained. As shown in FIG. 11, when an angle θ made by the line segment connecting the two designated points and the vertical direction is smaller than 45°, the display direction of the radiography environment is set to right or left.

This function suppresses the length of the measurement region 408 from becoming extremely short. Hence, such a state can always be maintained that the change operation can easily be executed.

In the third embodiment, the threshold value of the angle made by the line segment connecting the two points and the vertical direction is set to 45°. Any other direction that makes the angle may be used, and any other angle may be used as the threshold value. Alternatively, the display direction may be changed when the angle made by the line segment connecting the two points and a predetermined direction exceeds the threshold value.

Even in the second embodiment, the operator can manually change the display direction. In the third embodiment, however, since the change is automatically done, the operability is higher than the second embodiment.

Fourth Embodiment

The fourth embodiment of the present invention will be described next.

The second and third embodiments presume only that the measurement region is parallel to the surface of the radiation sensor. However, the actual measurement region may tilt with respect to the surface of the radiation sensor. In the second and third embodiments, measurement of a length or ratio is impossible in this case. The fourth embodiment has a function of obtaining the ratio of the length on an image on the radiation sensor to the actual length of the measurement region even in such a case.

Figure 12:
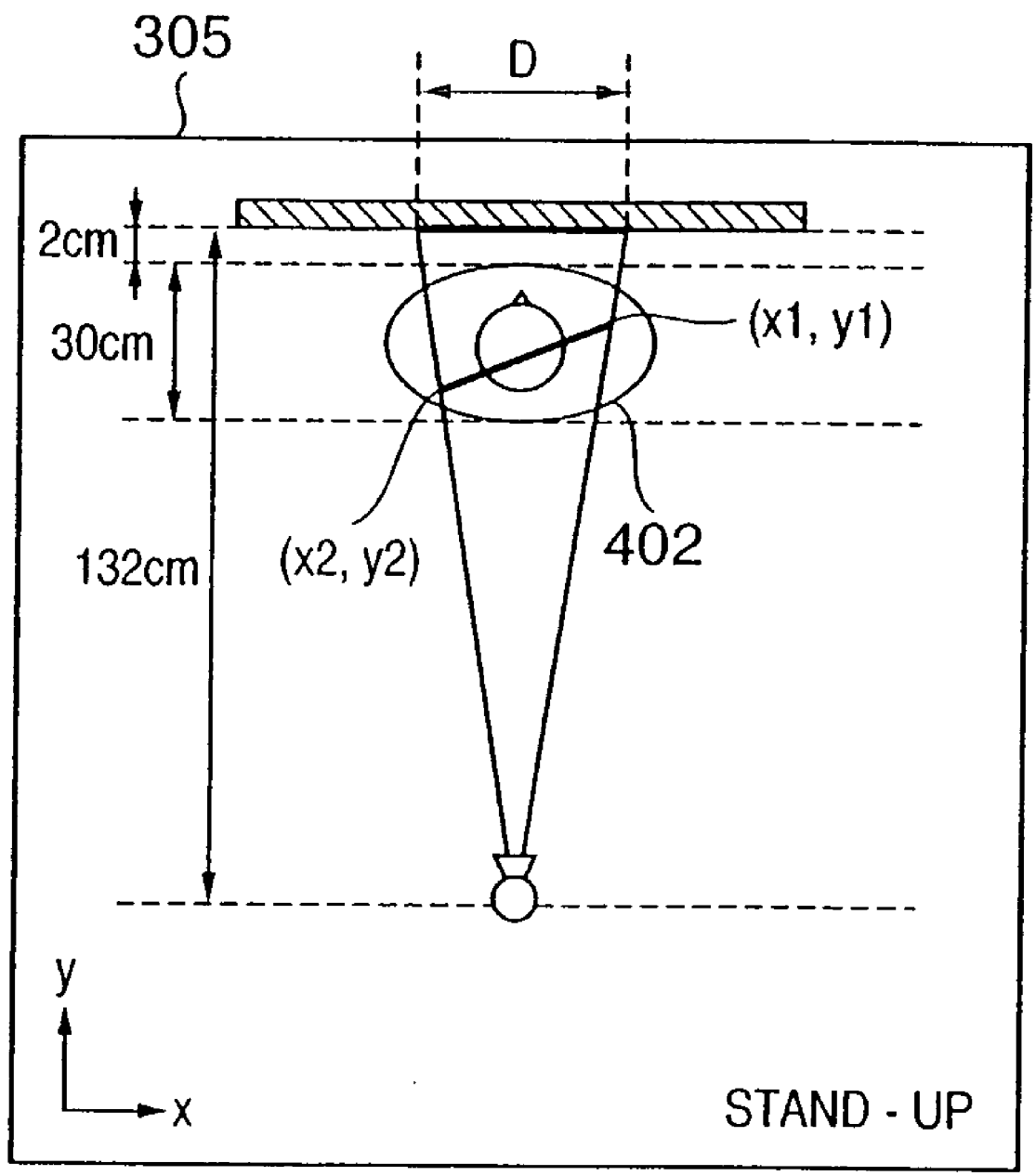
FIG. 12 is a view showing the function and operation of a radiographic image display apparatus according to the fourth embodiment of the present invention.

FIG. 12 is a view showing the function and operation of a radiographic image display apparatus according to the fourth embodiment of the present invention.

In the fourth embodiment, when two points are designated in measurement processing, the x- and y-coordinates (x1,y1) and (x2,y2) of the two designated points on a radiography environment window 305 or an X-ray image displayed on an image display unit 204 are obtained. The position of the origin at this time is not particularly limited. Using a distance D on the sensor, the enlargement ratio and reduction ratio are given by $$\text{Enlargement ratio}(\%) = \frac{D}{\sqrt{(x1-x2)^2 + (y1-y2)^2}} \times 100$$

$$\text{Reduction ratio}(\%) = \frac{\sqrt{(x1-x2)^2 + (y1-y2)^2}}{D} \times 100$$

The enlargement ratio and reduction ratio are obtained only when a line segment 303 is horizontal on the X-ray image, as in the second embodiment. When the line segment 303 tilts, as in the third embodiment, the z-coordinate in the Z-axis direction perpendicular to the X-Y plane must be taken into consideration.

Instead of displaying the distance D and the enlargement ratio or reduction ratio in a measurement value display frame 304, a value given by $$\sqrt{(x1-x2)^2+(y1-y2)^2}$$

may be displayed as the actual length (actual measurement value) of the measurement region. Alternatively, as in the first embodiment, the distance D, the magnification (enlargement ratio or reduction ratio), and the actual measurement value may be displayed.

Figure 13:
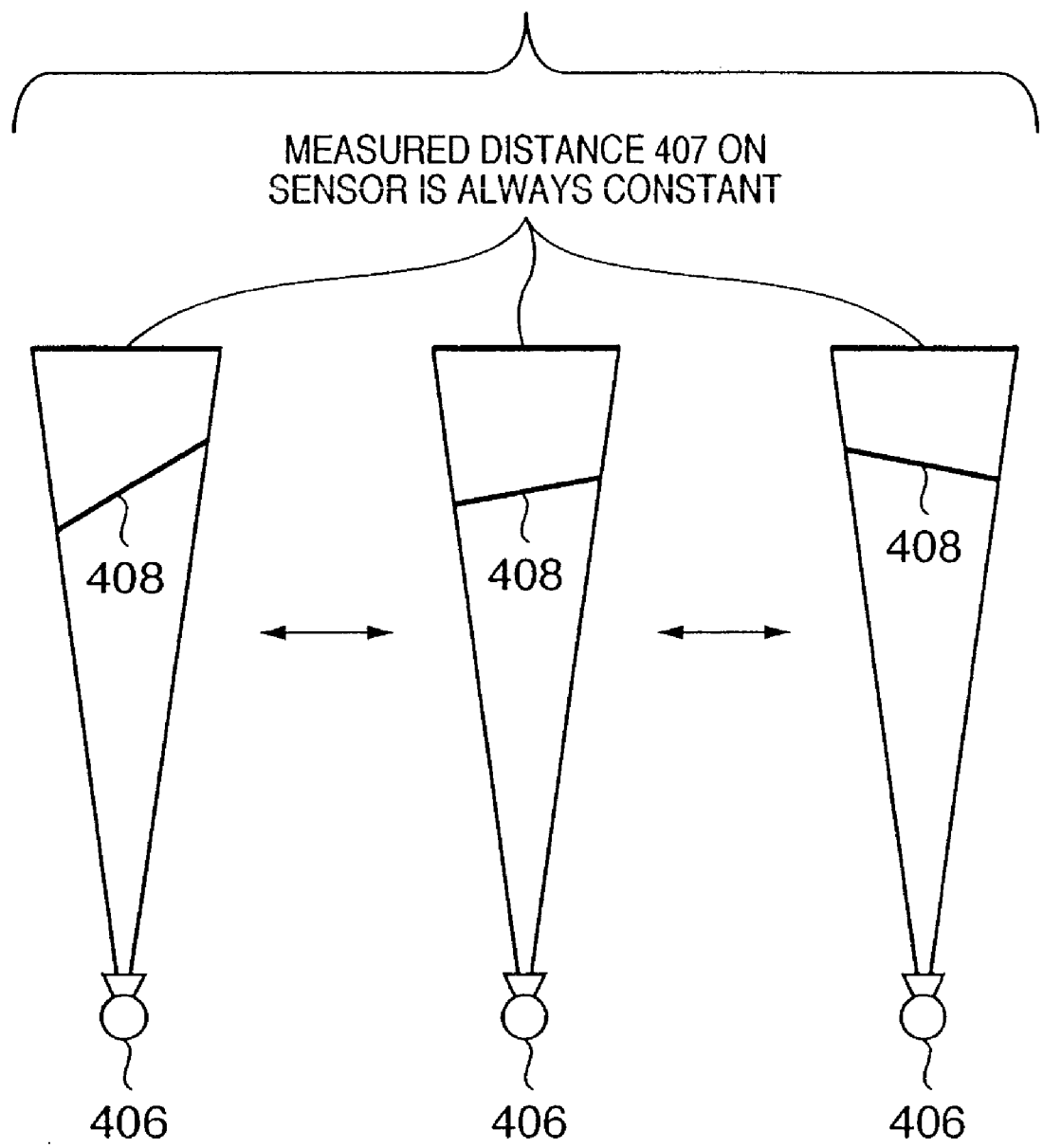
FIG. 13 is a view showing the moving form of a measurement region according to the fourth embodiment of the present invention.

To make it possible to move a measurement region 408 obliquely with respect to the direction of depth of an object 402, a program is created such that, for example, the end points of the measurement region 408 can be dragged by a mouse or the like. At this time, the end points of the measurement region 408 are preferably moved such that a length 407 in the image on the radiation sensor always becomes constant, as shown in FIG. 13.

As described above, according to the fourth embodiment, even the distance between two points at different depths in the object 402 can accurately and easily be obtained.

The arrangements of the first to fourth embodiments are merely examples and can also be combined arbitrarily in accordance with the application purpose or object.

The object of the present invention can also be achieved by supplying a recording medium which stores software program codes for implementing the functions of the radiographic image display apparatus of one of the first to fourth embodiments to a system or apparatus and causing the computer (or CPU or MPU) of the system or apparatus to read out and execute the program codes stored in the recording medium.

In this case, the program codes read out from the recording medium implement the functions of each of the first to fourth embodiments by themselves, and the recording medium which stores the program codes constitutes the present invention. As the recording medium for supplying the program codes, for example, a ROM, flexible disk, hard disk, optical disk, magnetooptical disk, CD-ROM, CD-R, magnetic tape, nonvolatile memory card, or the like can be used.

The functions of each of the first to fourth embodiments are implemented not only when the readout program codes are executed by the computer but also when the OS running on the computer performs part or all of actual processing on the basis of the instructions of the program codes.

The functions of each of the first to fourth embodiments are also implemented when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

Figure 14:
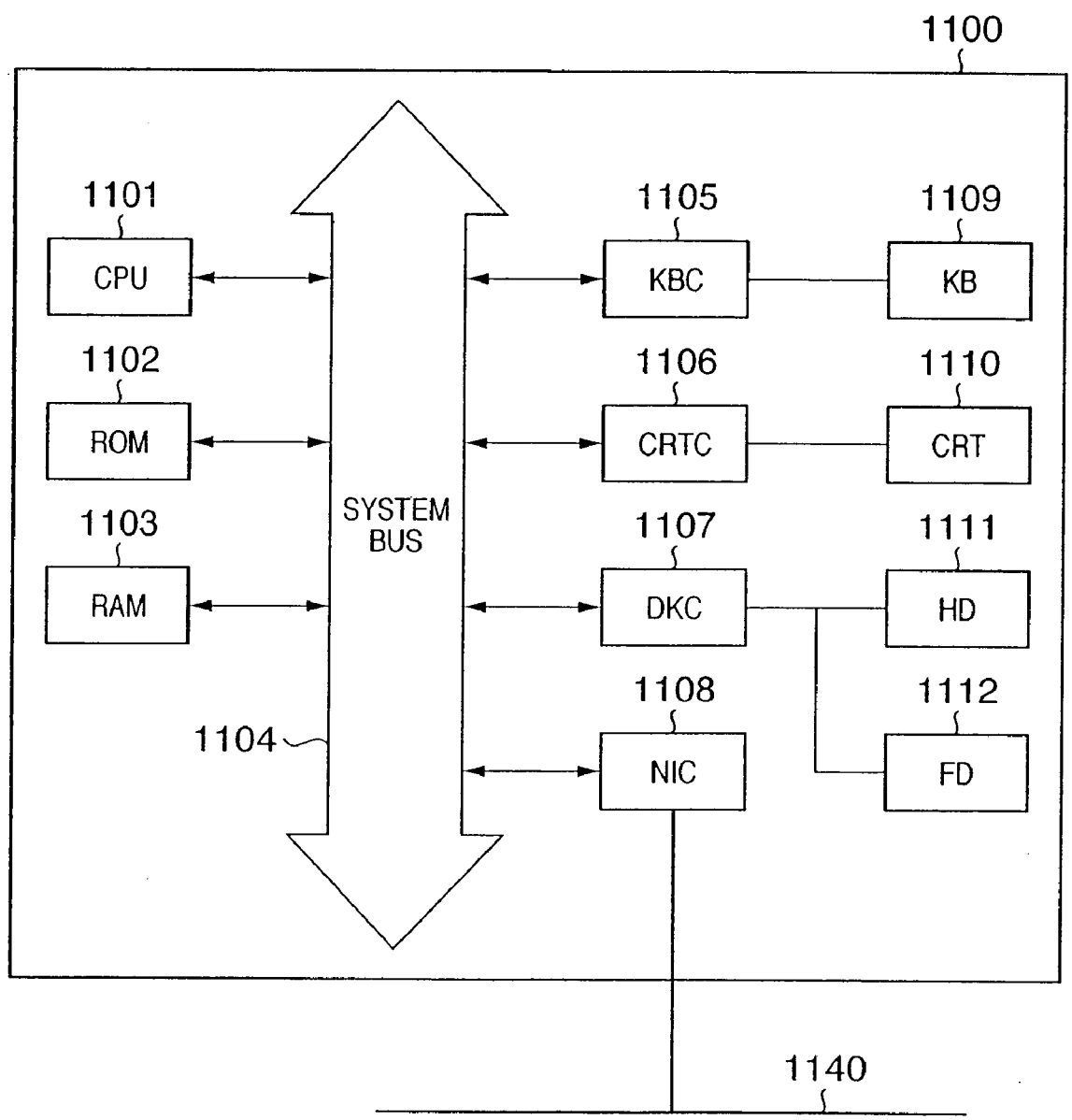
FIG. 14 is a block diagram showing the functional arrangement of a computer.

FIG. 14 shows the arrangement of a computer function 1100. As shown in FIG. 14, in the computer function 1100, a CPU 1101, a ROM 1102, a RAM 1103, a keyboard controller (KBC) 1105 of a keyboard (KB) 1109, a CRT controller (CRTC) 1106 of a CRT monitor (CRT) 1110 serving as a display unit, a disk controller (DKC) 1107 of a hard disk (HD) 1111 and flexible disk (FD) 1112, and a network interface card (NIC) 1108 for connection of a network 1140 are connected via a system bus 1104 to be communicable with each other.

The CPU 1101 systematically controls the components connected to the system bus 1104 by executing software stored in the ROM 1102 or HD 1111 or software supplied from the FD 1112. More specifically, the CPU 1101 executes control to implement the operation of each of the first to fourth embodiments by reading out a processing program corresponding to a predetermined processing sequence from the ROM 1102, HD 1111, or FD 1112 and executing the program.

The RAM 1103 functions as a main memory or work area of the CPU 1101. The KBC 1105 controls instruction input from the KB 1109 or a pointing device (not shown). The CRTC 1106 controls display of the CRT 1110. The DKC 1107 controls access to the HD 1111 and FD 1112 which store boot programs, various applications, editing files, user files, network management programs, and a predetermined processing program in each of the first to fourth embodiments. The NIC 1108 bidirectionally transmits/receives data to/from another apparatus or system on the network 1140.

The present invention is not limited to the above embodiments and various changes and modifications can be made within the spirit and scope of the present invention. Therefore, to apprise the public of the scope of the present invention, the following claims are made.

What is claimed is:

1. An image display apparatus which displays on a screen a radiographed image of an actual object radiographed by a radiation sensor, comprising:
   setting means for setting a ratio between a length of the radiographed image and an actual length of the actual object;
   point display means for displaying two designated points within the radiographed image displayed on the screen, the two designated points corresponding to two points on the actual object;
   measurement means for measuring a distance between positions of the two designated points;

calculation means for calculating, on the basis of the ratio set by said setting means and a measurement value by said measurement means, an actual measurement value of the two points on the actual object corresponding to the measurement value of the distance between the positions of the two designated points on the radiographed image; and value display means for displaying a line which connects the positions of the two designated points, the actual measurement value calculated by said calculation means on the basis of the two designated points and the ratio on the screen, wherein the actual measurement value and the ratio are displayed near the line.

2. The apparatus according to claim 1, wherein said value display means displays the actual measurement value in a form of an equation representing a relationship between the ratio set by said setting means, the measurement value by said measurement means, and the actual measurement value calculated by said calculation means.

3. The apparatus according to claim 1, further comprising drawing means for drawing a line which connects the two designated points displayed on the screen, wherein said value display means displays the actual measurement value calculated by said calculation means between the displayed two designated points and near the line drawn by said drawing means.

4. The apparatus according to claim 3, wherein said value display means displays the actual measurement value calculated by said calculation means on the line drawn by said drawing means.

5. The apparatus according to claim 1, wherein the ratio set by said setting means is used only for the actual measurement value about the actual object, which is calculated by said calculation means after the ratio is set.

6. The apparatus according to claim 1, wherein said setting means inputs an actual measurement value of an actual reference object radiographed in the image and calculates and sets the ratio on the basis of the actual measurement value and a measurement value on the radiographed image.

7. The apparatus according to claim 1, further comprising:
positional relationship setting means for setting a mutual positional relationship between the actual object, the radiation sensor prepared in the radiography unit, and a radiation source for radiographing the actual object; and
radiography environment display means for displaying on the screen a radiography environment including the positional relationship set by said positional relationship setting means,
wherein said setting means sets the ratio on the basis of the positional relationship set by said positional relationship setting means.

8. The apparatus according to claim 7, wherein when the radiographed image displayed on the screen is an image on a plane parallel to a surface of the radiation sensor, said positional relationship setting means is configured to be able to change positions of at least the parallel plane, the radiation sensor, and the radiation source.

9. The apparatus according to claim 7, wherein when the radiographed image displayed on the screen is an image on a plane tilted from a surface of the radiation sensor, said positional relationship setting means is configured to be able to change positions of at least end portions of a region corresponding to the image in the tilted plane, the radiation sensor, and the radiation source.

10. The apparatus according to claim 7, wherein said positional relationship setting means is configured to be able to control the movement of the plane within a range of a thickness of the actual object.

11. The apparatus according to claim 7, wherein said radiography environment display means is configured to be able to change a display form of the radiography environment on the basis of a direction in which a line segment which connects the two points runs.

12. The apparatus according to claim 7, wherein said radiography environment display means schematically displays the actual object, the radiation sensor, and the radiation source in an arbitrary window on the screen the positional relationship with a display direction representing a direction of the schematic display and a radiography posture of the actual object.

13. An image display method of displaying on a screen a radiographed image of an actual object radiographed by a radiation sensor, comprising:
a setting step of setting a ratio between a length of the radiographed image and an actual length of the actual object;
a point display step of displaying two designated points within the radiographed image displayed on the screen, the two designated points corresponding to two points on the actual object;
a measurement step of measuring a distance between positions of the two designated points;
a calculation step of calculating, on the basis of the ratio set in the setting step and a measurement value in the measurement step, an actual measurement value of the two points on the actual object corresponding to the measurement value of the distance between the positions of the two designated points on the radiographed image; and
a value display step of displaying a line which connects the positions of the two designated points, the actual measurement value calculated in the calculation step on the basis of the two designated points and the ratio on the screen,
wherein the actual measurement value and the ratio are displayed near the line.

14. The method according to claim 13, wherein in the value display step, the actual measurement value calculated in the calculation step is displayed in a form of an equation representing a relationship among the ratio, the measurement value, and the actual measurement value.

15. The method according to claim 13, further comprising a drawing step of drawing a line which connects the two designated points on the image,
wherein in the value display step, the actual measurement value calculated in the calculation step is displayed between the displayed two designated points and near the line drawn in the drawing step.

16. The method according to claim 15, wherein in the value display step, the actual measurement value calculated in the calculation step is displayed on the line drawn in the drawing step.

17. The method according to claim 13, wherein the ratio set in the setting step is used for the actual measurement value about the actual object, which is calculated in the calculation step after the ratio is set.

18. The method according to claim 13, wherein in the setting step, an actual measurement value of an actual reference object radiographed in the image is input, and the ratio is calculated and set on the basis of the actual measurement value and a measurement value on the radiographed image.

19. The method according to claim 13, further comprising:
a positional relationship setting step of setting a mutual positional relationship between the actual object, the radiation sensor prepared in the radiography unit, and a radiation source in radiographing the actual object;
a radiography environment display step of displaying on the screen a radiography environment including the positional relationship set in the positional relationship setting step,
wherein the ratio magnification is set on the basis of the positional relationship.

20. A computer program stored on a computer-readable medium which controls an image display apparatus which displays on a screen a radiographed image of an actual object radiographed by a radiation sensor, comprising:
a program code for a setting step of setting a ratio which indicates a ratio between a length of the radiographed image and an actual length of the actual object;
a program code for a point display step of displaying two designated points within the radiographed image displayed on the screen, the two designated points corresponding to two points on the actual object;
a program code for a measurement step of measuring a distance between positions of the two designated points;
a program code for a calculation step of calculating, on the basis of the ratio set in the setting step and a measurement value in the measurement step, an actual measurement value of the two points on the actual object corresponding to the measurement value of the distance between the positions of the two designated points on the radiographed image; and
a program code for a value display step of displaying a line which connects the positions of the two designated points, the actual measurement value calculated in the calculation step on the basis of the two designated points and the ratio on the screen,
wherein the actual measurement value and the ratio are displayed near the line.

21. The program according to claim 20, further comprising a program code for a drawing step of drawing a line which connects the two designated points, wherein in the value display step, the actual measurement value calculated in the calculation step is displayed between the displayed two designated points and near the line drawn in the drawing step.

22. The program according to claim 20, wherein the ratio set in the setting step is used for the actual measurement value about the actual object, which is calculated in the calculation step after the ratio is set.

23. The program according to claim 20, wherein in the setting step, an actual measurement value of an actual reference object radiographed in the image is input, and the ratio is calculated and set on the basis of the actual measurement value and a measurement value on the radiographed image.

24. The program according to claim 20, further comprising:
a program code for an image display step of displaying the radiographed image on the screen;
a program code for a measurement step of measuring a distance between positions of two designated points on the radiographed image;
a program code for a measurement value display step of displaying a measurement value in the measurement step on the screen;
a program code for a positional relationship setting step of setting a mutual positional relationship between the actual object, the radiation sensor, and a radiation source for radiographing the actual object;
a program code for a radiography environment display step of displaying on the screen a radiography environment including the positional relationship set in the positional relationship setting step;
a program code for a ratio calculation step of calculating a ratio of the measurement value to an actual measurement value about the actual object corresponding to the measurement value by using the positional relationship set in the positional relationship setting step; and
a program code for a ratio display step of displaying the ratio calculated in the ratio calculation step on the screen.

25. An image display system comprising:
a radiation source which generates radiation toward the radiation sensor; and
the image display apparatus of claim 1.

26. An image display apparatus which displays on a screen an image of an actual object radiographed by a radiation sensor, comprising:
a setting unit adapted to set a ratio between a length of the radiographed image and an actual length of the actual object;
a point display unit adapted to display two designated points within the radiographed image displayed on the screen, the two designated points corresponding to two points on the actual object;
a measurement unit adapted to measure a distance between positions of the two designated points;
a calculation unit adapted to calculate, on the basis of the ratio set by said setting unit and a measurement value by said measurement unit, an actual measurement value of the two points on the actual object corresponding to the measurement value of the distance between the positions of the two designated points on the radiographed image; and
a value display unit adapted to display a line which connects the positions of the two designated points, the actual measurement value calculated by said calculation unit on the basis of the two designated points and the ratio displayed on the screen,
wherein the actual measurement value and the ratio are displayed near the line.

* * * * *

UNITED STATES PATENT AND TRADEMARK OFFICE
CERTIFICATE OF CORRECTION

PATENT NO. : 7,239,733 B2
APPLICATION NO. : 10/885059
DATED : July 3, 2007
INVENTOR(S) : Abe et al.

It is certified that error appears in the above-identified patent and that said Letters Patent is hereby corrected as shown below:

COLUMN 1:
Line 6, "priorities" should read -- priority --;
Line 17, "radiodignosis" should read -- radiodiagnosis --; and
Line 39, "panel" should read -- panel are used --.

COLUMN 2:
Line 65, Delete "wherein".

COLUMN 4:
Line 63, "apparatus of the apparatus." should read -- apparatus of the system --.

COLUMN 8:
Line 32, "two designed" should read -- two designated --.

COLUMN 18:
Line 4, "magnetooptical disk," should read -- magneto-optical disk, --.

COLUMN 20:
Line 13 Claim 12, "screen" should read -- screen, --.

Signed and Sealed this

Twenty-ninth Day of April, 2008

JON W. DUDAS
*Director of the United States Patent and Trademark Office*